US012213555B2

(12) United States Patent
Miller

(10) Patent No.: US 12,213,555 B2
(45) Date of Patent: Feb. 4, 2025

(54) ADDITIVE COLOR PRINTING

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/494,664

(22) Filed: Oct. 25, 2023

(65) Prior Publication Data

US 2024/0049831 A1   Feb. 15, 2024

Related U.S. Application Data

(60) Continuation of application No. 15/488,301, filed on Apr. 14, 2017, now Pat. No. 11,832,680, which is a
(Continued)

(51) Int. Cl.
*A43B 1/00*   (2006.01)
*A41D 31/02*   (2019.01)
(Continued)

(52) U.S. Cl.
CPC ............ *A43B 1/0027* (2013.01); *A41D 31/02* (2013.01); *A43B 1/0072* (2013.01); *A43B 5/02* (2013.01); *A43B 23/02* (2013.01); *B41J 2/21* (2013.01); *B41J 3/407* (2013.01); *B41M 5/0047* (2013.01); *B41M 5/0058* (2013.01); *B41M 5/0064* (2013.01); *B41M 5/0076* (2013.01); *B41M 5/0088* (2013.01); *D06P 1/44* (2013.01); *D06P 1/5257* (2013.01); *D06P 5/30* (2013.01); *H04N 1/54* (2013.01); *B41M 2205/38* (2013.01); *B41M 2205/42* (2013.01)

(58) Field of Classification Search
CPC .... A41D 31/02; A43B 1/0027; A43B 1/0072; A43B 5/02; A43B 23/02; B41J 2/21; B41J 3/407; B41M 5/0047; B41M 5/0058; B41M 5/0064; B41M 5/0076; B41M 5/0088; D06P 1/44; D06P 1/5257; D06P 5/30; H04N 1/54
See application file for complete search history.

(56) References Cited

U.S. PATENT DOCUMENTS 5,721,059 A   2/1998   Kito et al.
6,007,318 A   12/1999   Russell et al.
(Continued)

FOREIGN PATENT DOCUMENTS

CN   102656237   9/2012
JP   2002-038063   6/2002
(Continued)

OTHER PUBLICATIONS

International Search Report and Written Opinion, issued Nov. 6, 2014, for corresponding International Application No. PCT/US2014/043779.
(Continued)

*Primary Examiner* — Christopher M Polley
*Assistant Examiner* — Sathavaram I Reddy
(74) *Attorney, Agent, or Firm* — Klarquist Sparkman, LLP

(57) ABSTRACT

Methods and systems are provided for color printing onto nonwhite substrates and articles. For example, an article of apparel is provided that includes multiple layers of ink with a combination of a white ink and at least one color ink, and each layer having a ratio of white ink to color ink, and the ratios of white ink to color ink are different.

20 Claims, 17 Drawing Sheets

Related U.S. Application Data continuation of application No. 14/740,485, filed on Jun. 16, 2015, now Pat. No. 9,656,475, which is a division of application No. 13/927,551, filed on Jun. 26, 2013, now Pat. No. 9,114,625.

(51) Int. Cl.

| | | |
|---|---|---|
| *A43B 5/02* | (2006.01) | |
| *A43B 23/02* | (2006.01) | |
| *B41J 2/21* | (2006.01) | |
| *B41J 3/407* | (2006.01) | |
| *B41M 5/00* | (2006.01) | |
| *D06P 1/44* | (2006.01) | |
| *D06P 1/52* | (2006.01) | |
| *D06P 5/30* | (2006.01) | |
| *H04N 1/54* | (2006.01) | |

(56) References Cited

U.S. PATENT DOCUMENTS

| | | |
|---|---|---|
| 6,020,399 A | 2/2000 | Matzinger |
| 6,676,249 B2 | 1/2004 | Lebens |
| 7,655,083 B2 | 2/2010 | Szajewski et al. |
| 7,674,501 B2 | 3/2010 | Raksha et al. |
| 8,632,146 B2 | 1/2014 | Yoshida |
| 9,114,625 B2 | 8/2015 | Miller |
| 2004/0187715 A1 | 9/2004 | Niimi |
| 2004/0252173 A1 | 12/2004 | Ofer et al. |
| 2005/0117009 A1 | 6/2005 | Kawaguchi et al. |
| 2006/0207448 A1 | 9/2006 | Fresener et al. |
| 2007/0104899 A1 | 5/2007 | Pearl et al. |
| 2010/0039463 A1 | 2/2010 | Van Thillo et al. |
| 2010/0066780 A1 | 3/2010 | Akatsuka |
| 2011/0139024 A1 | 6/2011 | Schiffmann |
| 2012/0019579 A1 | 1/2012 | Usuda et al. |
| 2012/0069080 A1 | 3/2012 | Yoshizawa |
| 2013/0174446 A1 | 7/2013 | Antonelli et al. |
| 2014/0354726 A1 | 12/2014 | Heath et al. |
| 2015/0002567 A1 | 1/2015 | Miller |

FOREIGN PATENT DOCUMENTS

| | | |
|---|---|---|
| WO | WO 2005/076730 | 8/2005 |
| WO | WO 2007/033031 | 3/2007 |

OTHER PUBLICATIONS

Introduction to Color Theory. Corel Draw. Accessed at https://learn.corel.com/wp-content/uploads/2016/12/CDGS_ColorTheory_WrittenTutorial.pdf, 2016.

Porter, "How to print on colored paper." Accessed at https ://web.archive.org/web/20120301030823/http://www.ehow.com/how_6525212_print-colored-paper. html, 2012.

ADDITIVE COLOR PRINTING

CROSS REFERENCE TO RELATED APPLICATIONS

This application is a continuation of U.S. patent application Ser. No. 15/488,301, filed Apr. 14, 2017, which is continuation of U.S. patent application Ser. No. 14/740,485, filed Jun. 16, 2015, now U.S. Pat. No. 9,656,475, which is a divisional of U.S. patent application Ser. No. 13/927,551, filed Jun. 26, 2013, now U.S. Pat. No. 9,114,625. The prior applications are incorporated herein by reference in their entirety.

FIELD

This disclosure relates generally to the field of color printing onto any substrate, and more specifically to a method of color printing onto any substrate (e.g., textiles or synthetic materials), the printed material having any color or opacity, and achieving color management, color durability, and abrasion resistance through printing of multiple layers of intermixed white and color printed material.

BRIEF DESCRIPTION OF THE DRAWINGS

The accompanying drawings, which are incorporated in and constitute a part of this specification, illustrate embodiments and, together with the description, serve to explain the features, advantages, and principles of the embodiments disclosed throughout this disclosure. For illustration purposes, the following drawings may not be to scale. Moreover, like reference numerals designate corresponding parts throughout the different views. In the drawings.

DETAILED DESCRIPTION

Figure 1:
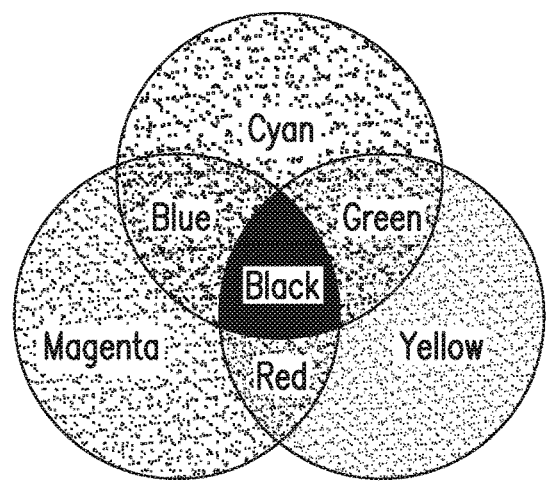
FIG. 1 shows a CMYK Venn diagram, consistent with an embodiment of the disclosure.

The following discussion and accompanying figures disclose methods and systems for color printing onto any substrate (e.g., textiles or synthetic materials), the printed material having any color or opacity, and achieving color management, color durability, and abrasion resistance through printing of multiple layers of intermixed white and color printed material. The disclosed methods and systems may use any suitable 3D printing system.

As used throughout this disclosure, the terms "color-accurate color" and "color accuracy" refer to the accurate representation, simulation, depiction, proofing, viewing, or otherwise the observation of one of more colors printed consistent with an embodiment of the disclosure on a white or a nonwhite substrate, such that the printed one or more colors achieve substantially indistinguishable visible color differentiation from one or more colors in printed on a white substrate with the CMYK color model. As also used throughout this disclosure, the terms "color printing," "inkjet printing," "CMYK printing," "CMYK inkjet printing," and "color inkjet printing" refer to printing of an image by ejecting droplets of one or more inks onto a substrate. Contrary to known "color printing," "inkjet printing," "CMYK printing," "CMYK inkjet printing," and "color inkjet printing," however, the disclosed "color printing," "inkjet printing," "CMYK printing," "CMYK inkjet printing," and "color inkjet printing" achieve color accuracy on a substrate of any color, whereas known printing techniques require printing onto a white substrate, such as white paper, in order to achieve the same or similar color accuracy on the substrate. As also used throughout this disclosure, the term "color durability" refers to the ability of a printed color to resist or otherwise minimize the visibility of scratches, abrasions, or other marring or damage to the printed color.

As used throughout this disclosure, the term "substrate" refers to any material on which printing consistent with the embodiments of the disclosure may occur, for example, paper, plastic, metal, articles of apparel, sports equipment, a textile, a natural fabric, a synthetic fabric, a knit, a woven material, a nonwoven material, a mesh, a leather, a synthetic leather, a polymer, a rubber, and a foam, or any combination of them.

Consistent with an embodiment, an exemplary substrate may be, for example, a fabric. As used throughout this disclosure, "fabric" may be used to refer generally to materials chosen from any textile, natural fabric, synthetic fabric, knit, woven material, nonwoven material, mesh, leather, synthetic leather, polymers, rubbers, and foam, and may also be used to refer to any natural or synthetic fiber or material, such as, for example, cotton, wool, linen, silk, nylon, elastane (i.e., spandex), polyester, rayon, and olefins (i.e., polypropylene), and may further comprise combinations of any of these materials. Also as used throughout this disclosure, the terms "printing" or "printed," and "depositing" or "deposited," are each used synonymously, and are intended to refer to the association of a material from a source of the material to a receiving surface or object.

Consistent with an embodiment, an exemplary substrate may also be, for example, an article of apparel. As used throughout this disclosure, the terms "article of apparel" and "fabric" thus include any textile and any materials associated with or made from fabric, including a sock or a shirt, and may also be applied to any article of clothing, apparel, or equipment. For example, the disclosed embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used throughout this disclosure, the term "article of apparel" may refer to any apparel or clothing, including hats, caps, shirts, jerseys, jackets, socks, shorts, pants, undergarments, athletic support garments, gloves, wrist or arm bands, sleeves, headbands, any knit material, any woven material, any nonwoven material, etc.

In accordance with the systems and methods described throughout this disclosure, there is provided a method of color printing, comprising: printing at least a first layer of ink comprising a white ink and at least one color ink, the first layer of ink having a predetermined first ratio of white ink to color ink; and printing at least a second layer of ink comprising the white ink and the at least one color ink, the second layer of ink having a predetermined second ratio of white ink to color ink different from the first ratio, wherein the first ratio is greater than the second ratio.

In accordance with the systems and methods described throughout this disclosure, there is also provided a method of color management, comprising: printing at least one color comprising multiple printed layers onto a substrate, the multiple printed layers comprising: at least a first layer of ink comprising a white ink and at least one color ink, the first layer of ink having a predetermined first ratio of white ink to color ink; and at least a second layer of ink comprising the white ink and the at least one color ink, the second layer of ink having a predetermined second ratio of white ink to color ink different from the first ratio, wherein the first ratio is greater than the second ratio.

In accordance with the systems and methods described throughout this disclosure, there is provided a method of hot-melt printing, comprising: printing a melt of an opaque material and at least one translucent pigmented material onto a substrate, the opaque material and the at least one translucent pigmented material being supplied from different printheads, wherein the opaque material and the at least one translucent pigmented material mix on the substrate, the printing further comprising: printing at least one color comprising multiple printed layers of the opaque material and the at least one translucent pigmented material, the multiple printed layers comprising: at least a first layer comprising the opaque material and the at least one translucent pigmented material, the first layer having a predetermined first ratio of opaque material to translucent pigmented material; and at least a second layer comprising the opaque material and the at least one translucent pigmented material, the second layer having a predetermined second ratio of opaque material to translucent pigmented material different from the first ratio, wherein the first ratio is greater than the second ratio.

In accordance with the systems and methods described throughout this disclosure, there is provided a method of printing a desired color onto a nonwhite substrate by additive printing of intermixed translucent color ink and opaque white ink, comprising: printing at least a first layer of ink onto the nonwhite substrate comprising a first mixture of an opaque white ink and at least one substantially translucent color ink, the first layer of ink having a predetermined first ratio of white ink to color ink being less than or equal to 1:1; and printing at least a second layer of ink onto the nonwhite substrate comprising a second mixture of the opaque white ink and the at least one substantially translucent color ink, the second layer of ink having a predetermined second ratio of white ink to color ink being less than or equal to 1:1, wherein the first ratio and the second ratio are substantially equal, and wherein a sum of the first printed layer and second printed layer produces the desired color being optically indistinguishable in the visible spectrum from the same color printed onto a white substrate using opaque color inks.

In accordance with the systems and methods described throughout this disclosure, there is also provided a method of color management, comprising: printing at least one desired color onto a nonwhite substrate by additive printing of intermixed translucent color ink and opaque white ink, the desired color comprising multiple printed layers, the multiple printed layers comprising: at least a first layer of ink comprising a first mixture of an opaque white ink and at least one substantially translucent color ink, the first layer of ink having a predetermined first ratio of white ink to color ink being less than or equal to 1:1; and at least a second layer of ink comprising a second mixture of the opaque white ink and the at least one substantially translucent color ink, the second layer of ink having a predetermined second ratio of white ink to color ink being less than or equal to 1:1, wherein the first ratio and the second ratio are substantially equal, and wherein a sum of the first printed layer and second printed layer produces the desired color being optically indistinguishable in the visual spectrum from the same color printed onto a white substrate using opaque color inks.

In accordance with the systems and methods described throughout this disclosure, there is provided a method of hot-melt printing, comprising: printing a melt of an opaque material and at least one translucent pigmented material onto a nonwhite substrate, the opaque material and the at least one translucent pigmented material being supplied from different printheads, wherein the opaque material and the at least one translucent pigmented material mix on the substrate, the printing further comprising: printing at least one desired color comprising multiple printed layers of the opaque material and the at least one translucent pigmented material, the multiple printed layers comprising: at least a first layer comprising the opaque material and the at least one translucent pigmented material, the first layer having a predetermined first ratio of opaque material to translucent pigmented material being less than or equal to 1:1; and at least a second layer comprising the opaque material and the at least one translucent pigmented material, the second layer having a predetermined second ratio of opaque material to translucent pigmented material being less than or equal to 1:1, wherein the first ratio and the second ratio are substantially equal, and wherein a sum of the first printed layer and second printed layer produces the desired color being optically indistinguishable in the visual spectrum from the same color printed onto a white substrate using opaque color inks.

Additional features and advantages will be set forth in part in the description that follows, being apparent from the description or learned by practice of embodiments. Both the foregoing description and the following description are exemplary and explanatory, and are intended to provide further explanation of the embodiments as claimed.

The CMYK color model used in inkjet printing typically relies on the presence of a white substrate, such as a white piece of paper, to achieve accurate representation of the colors of one or more printed color inks. "CMYK" refers to four color inks used in color inkjet printing: "C" for cyan, "M" for magenta, "Y" for yellow, and "K" for black. Color inkjet printers may contain print heads, inkjet cartridges, or ink reservoirs of cyan, magenta, yellow, and black.

CMYK printing may produce or approximate essentially any color in the visible spectrum by printing and intermixing various combinations of color ink, as exemplified by the CMYK Venn diagram shown in FIG. 1. Referring to FIG. 1, cyan, magenta, and yellow inks may be intermixed during printing to produce one or more colors of red, green, and blue as shown. Further intermixing of colors during printing may be used to produce many more colors beyond the primary colors of red, green, and blue, or of cyan, magenta, and yellow, as shown in FIG. 1. Cyan, magenta, and yellow inks may also be intermixed to produce black. Black produced as shown in the CMYK Venn diagram of FIG. 1, however, may appear visually to an observer as a lighter black instead of a very dark or true black. Therefore, CMYK printers may also contain a separate cartridge or reservoir filled with black ink for printing of a true black.

CMYK printed inks are generally considered subtractive in nature, in that they essentially reduce the whiteness of an underlying white substrate when viewed by reflected visible light by at least partially masking it with one or more layers of printed CMYK color inks. CMYK inks are also typically water-based, and intermix and dry on the surface of the substrate after printing.

Figure 2:
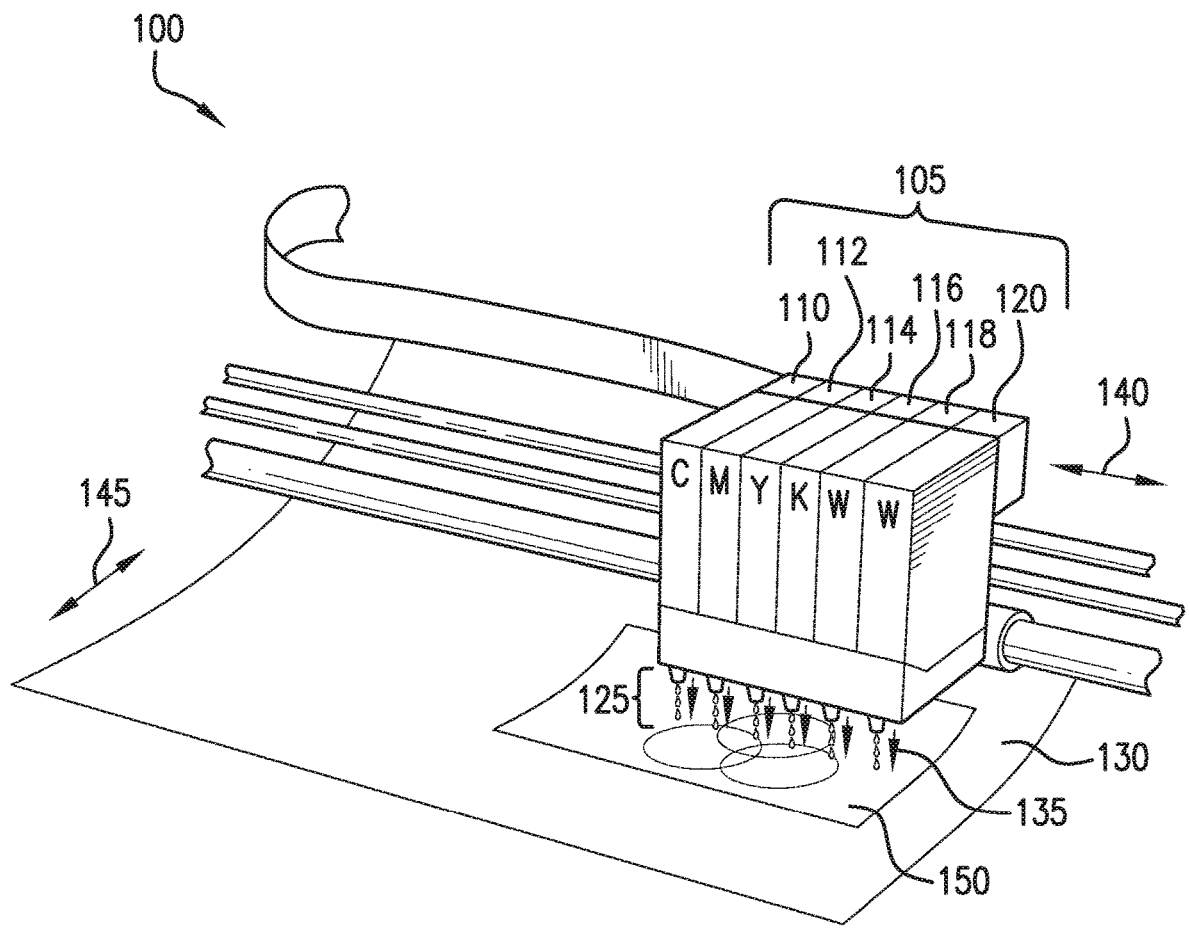
FIG. 2 shows a perspective view of a portion of an ink printer having CMYK and white printing capabilities, consistent with an embodiment of the disclosure.

Printing of the CMYK color inks typically requires a white substrate because the printed inks are at least translucent, and color-accurate printing relies on light reflected from an underlying white substrate through the printed color inks to achieve color in the visible spectrum that is recognizable to the human eye. Referring to FIG. 2, and consistent with an embodiment, an inkjet printer 100 is shown comprising inkjet cartridges 105. Cartridges 105 comprise cartridge 110 for cyan ("C"), cartridge 112 for magenta ("M"), cartridge 114 for yellow ("Y"), cartridge 116 for black ("K"), and two cartridges 118, 120 for white ("W"). While two cartridges for white are depicted in FIG. 2, consistent with an embodiment, printer 100 may contain only one cartridge for white, or may contain more than one cartridge for white, as shown. Moreover, the ink contained in white cartridges 118, 120 may be an opaque ink, for reasons explained further below.

Still referring to FIG. 2, and consistent with an embodiment, cartridges 105 may print droplets of ink 125 onto substrate 130. Substrate 130 may be a piece of paper, or any other substrate, such as a textile or fabric, as described above. Ink droplets 125 may be ejected from one or more of cartridges 105 and directed toward substrate 130 as shown by ink droplet movement direction 135. As ink droplets 125 are printed, cartridges 105 may be moved across substrate 130 as shown by direction 140, while substrate 130 may be moved perpendicular to direction 140 as shown by direction 145, both to facilitate printing. In this manner, printing of features 150, such as images, graphics, designs, and text, may be achieved on substrate 130.

Figure 3:
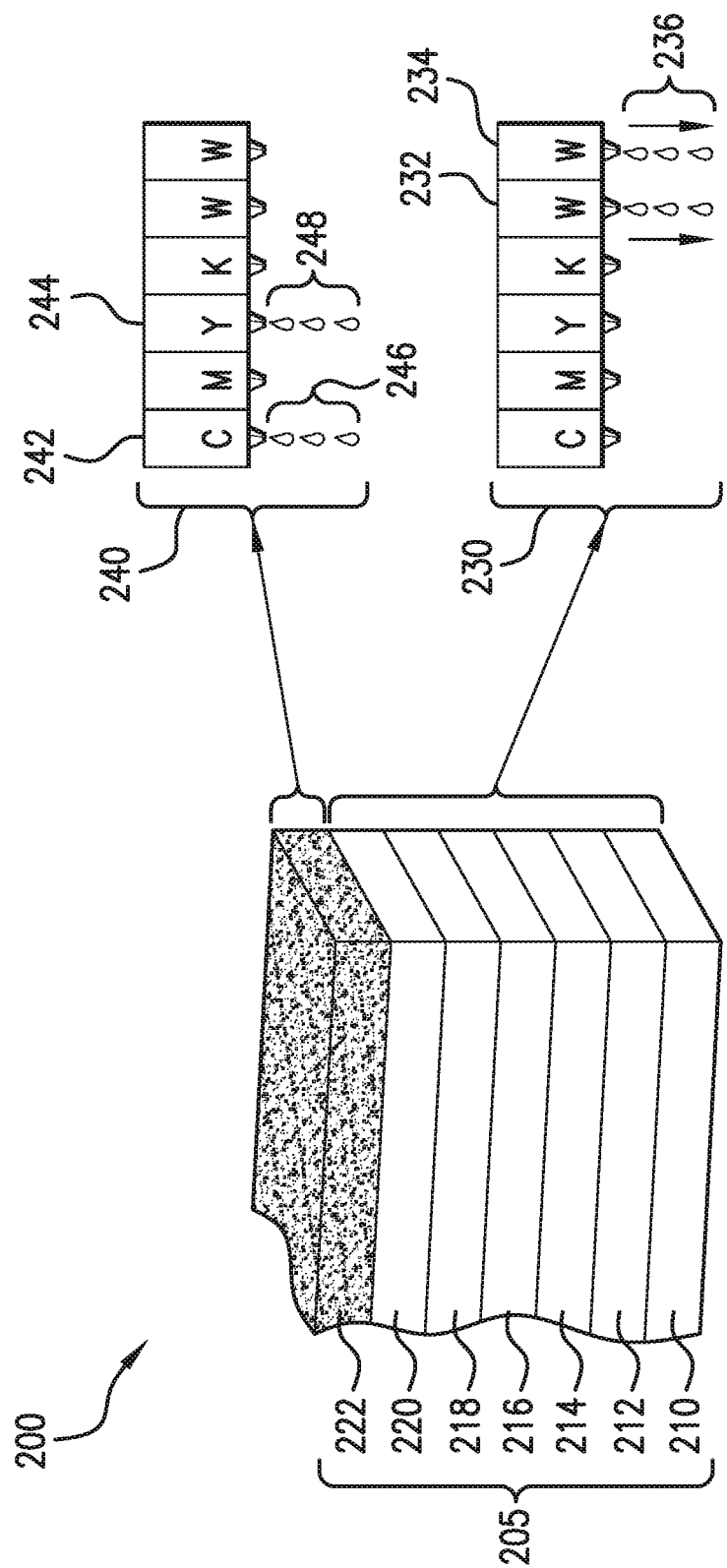
FIG. 3 shows a perspective view of a sequence of printed layers printed via a conventional printing technique used to print green color ink over a nonwhite substrate, along with a depiction of the printheads used for printing each of the respective printed layers.

Consistent with an embodiment, use of the CMYK color model and printing techniques may be accomplished on white or on nonwhite substrates. In order to print color onto nonwhite substrates using a printer similar to that shown in FIG. 2, layers printed using an existing printing technique 200 are shown in FIG. 3. Referring to FIG. 3, for example, layers printed using existing printing technique 200 first require the reproduction, simulation, or creation of an underlying white substrate in order to achieve color accuracy in a final printed color printed thereon. FIG. 3 thus shows a perspective view of a sequence of printed layers printed via an existing printing technique 200 used to print color ink over a nonwhite substrate, along with a depiction of the printheads used for printing each of the respective printed layers.

As shown in FIG. 3, portions of multiple printed layers 205 are shown in perspective view. Layers 205 comprise six printed layers of white 210, 212, 214, 216, 218, and 220. Six layers of white are shown in FIG. 3, although more or less layers of white may be printed using existing printing technique 200. White layers 210, 212, 214, 216, 218, and 220 are used to create a white substrate onto which color printing may occur. Color layer 222 is the final printed layer, printed over the white layers, and which may be any color printed according to the CMYK model.

Still referring to FIG. 3, a depiction of print cartridges or heads 230 shows the inks used print the six layers of white 210, 212, 214, 216, 218, and 220. For example, to print the six layers of white that create a white substrate via printed ink, white ink cartridges 232, 234 are used to eject droplets of white ink 236, while the remaining color cartridges remain inactive. White ink 236 may be an opaque ink, which will reflect visible light impinging thereon in order to simulate a white substrate underneath subsequently printed one or more translucent color inks. White ink 236 also serves to cover the regions of the nonwhite substrate on which subsequent printing of color will occur.

In addition, depiction of print cartridges or heads 240 in FIG. 3 shows the inks used to print color layer 222 upon completion of printing the six opaque layers of white. Color layer 222 may be formed from printing a translucent ink to enable reflection of visible light from the underlying printed opaque white ink 236. For example, color layer 222 may be a printed layer of color-accurate green, achieved by using ink printed from cyan cartridge 242 and yellow cartridge 244 as shown in FIG. 3. Cartridges 242 and 244 are thus used to eject droplets of translucent cyan ink 246 and translucent yellow ink 248, while the remaining cartridges are inactive. Droplets 246 and 248 intermix upon printing onto the uppermost white layer 220 to form, in the example shown in FIG. 3, a color-accurate green color in color layer 222. The color-accurate green color of color layer 222 may be observed visually by viewing light reflected from underlying white layer 220 passing through layer 222 to an observer's eyes. Even though green color is used in the example described with reference to FIG. 3, any color may be printed using the CMYK color model or palette. Such color may then be subsequently observed, so long as a white substrate is first created underneath the final printed color layer.

Still referring to FIG. 3, a drawback to layers printed using existing printing technique 200 is that it requires printing of many extra layers of ink in order to print color-accurate colors on a nonwhite substrate. For example, several layers of opaque white ink must first be printed in order to effectively simulate a white substrate underlying a subsequently printed color layer. This technique requires more printing time, more printed layers, and usage of a higher density and amount of printed ink. Moreover, if the final printed color layer is scratched, abraded, or otherwise marred or damaged, it is likely that the printed color would be removed in the region of the scratch, abrasion, or mar. Thus, it is likely that one or more of the underlying white layers would be exposed, thereby displaying an undesirable high contrast between the final printed color layer and the exposed underlying white layer(s). Thus, the cost to print on a nonwhite substrate using the existing technique is greater and has more complications to achieving a final printed color-accurate color.

Figure 4:
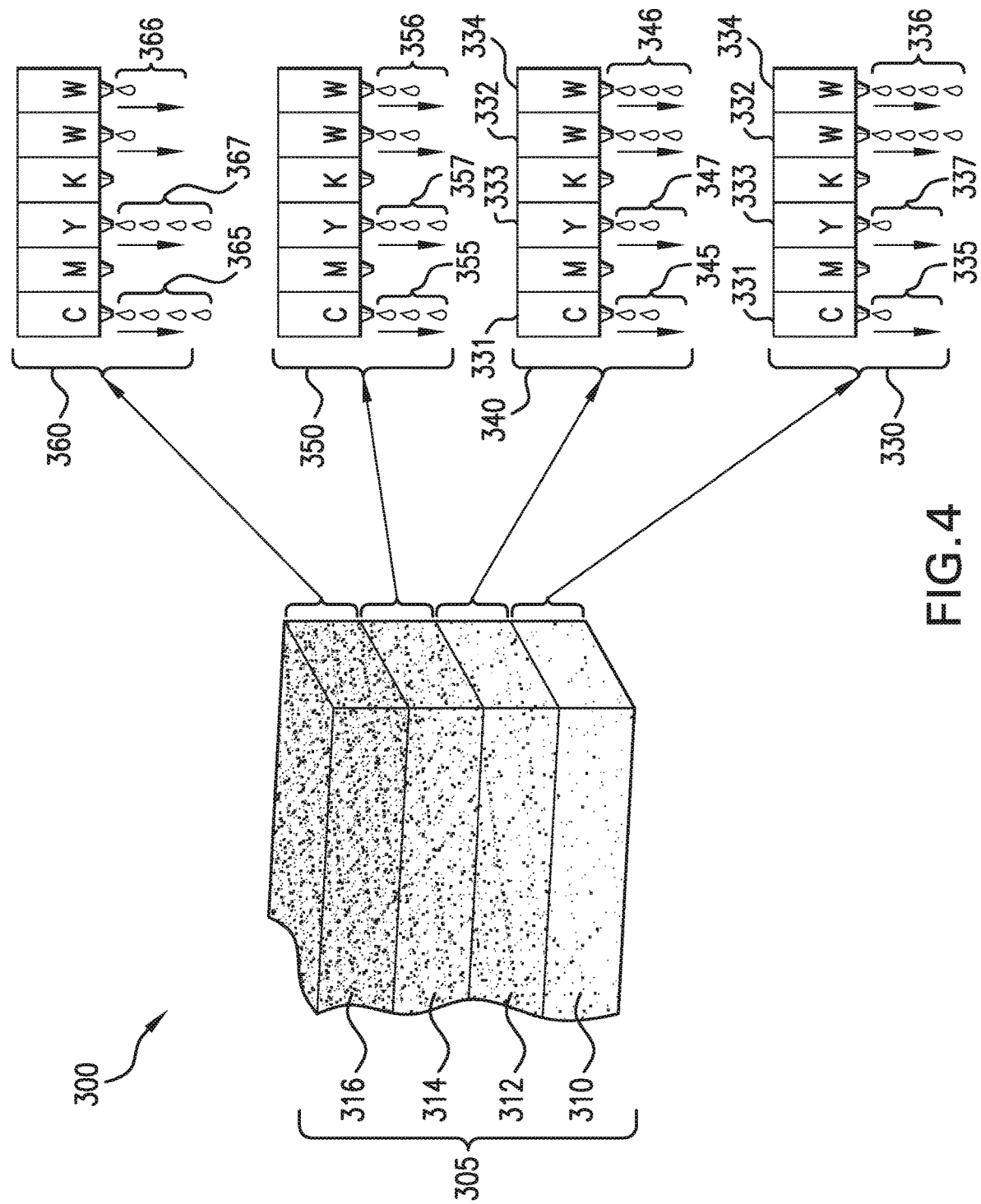
FIG. 4 shows a perspective view of an exemplary sequence of printed layers printed consistent with an embodiment of the disclosure, the printed layers producing a color-accurate green color ink over a nonwhite substrate, along with a depiction of the printheads and relative amounts of ink used for each of the respective printed layers.

In contrast, and consistent with an embodiment, FIG. 4 shows a perspective view of an exemplary sequence of printed ink layers that produce a color-accurate color over a nonwhite substrate, along with a depiction of the printheads used for each of the respective printed layers according to printing technique 300. As will be described with reference to FIG. 4, printing technique 300 differs from known techniques in that printer 100 may print white ink at the same time as color ink. The printed pattern of ink droplets may comprise a stochastic dot pattern, chaotic in nature, which mixes with itself either as the ink is ejected onto the substrate or immediately upon printing onto the substrate. The printed white ink and color ink may thus intermix upon printing onto a substrate, analogous to what the print industry may identify as a solid color or spot color. The intermixed and printed white and color inks are mixed on demand and upon printing onto a substrate in a manner analogous to house paint, such that printing multiple layers of this intermixed white and color inks builds up opacity over the course of multiple printed layers. This built-up opacity avoids the need to simulate or reproduce a white substrate underneath the printed color layer, in contrast to known printing technique 200, and allows for printing color-accurate colors on nonwhite substrates with fewer printed layers and less ink used.

As shown in FIG. 4, portions of multiple printed layers 305 printed using printer 100 are shown in perspective view. Layers 305 comprise four layers of printed material 310, 312, 314, and 316. Four layers of intermixed white and color inks are shown in the example of FIG. 4, although more or less layers may be printed to achieve printing of a desired color-accurate color. The desired color-accurate color for printing will thus be built-up over the course of printing each of layers 310, 312, 314, and 316 by decreasing the ratio of white ink to color ink with each successive printed layer. That is, the ratio of white ink to color ink in first printed layer 310 may be high, while the ratio of white ink to color ink in final printed layer 316 may be low. For example, the amount of white ink may decrease in each of successively printed layers 310, 312, 314, and 316, while the amount of color ink may correspondingly increase in each of successively printed layers 310, 312, 314, and 316. Details of printing technique 300 will be further described below.

In contrast to existing technique 200, the final printed layer 316 printed according to printing technique 300 does not have to be the final desired color-accurate color printed according to the CMYK model. That is, printing technique 300 does not require that the uppermost printed layer solely be the color-accurate color as a standalone printed layer. Rather, it is the combination of each of printed layers 310, 312, 314, and 316 that, when taken together, create the color-accuracy for a desired color printed according to the CMYK model. Because each of printed layers 310, 312, 314, and 316 comprise intermixed translucent color ink and opaque white ink, the mixture of translucency and opacity of the various components of the printed layers work in concert to achieve observable color-accuracy of the final desired printed color. This may be observed when visible light passes through and reflects back from layers 310, 312, 314, and 316. This will be later described in more detail with reference to FIG. 13.

Still referring to FIG. 4, a depiction of print cartridges or heads 330, 340, 350, and 360 shows the inks used to respectively print the exemplary four layers of intermixed color and white inks 310, 312, 314, and 316. For example, to print an exemplary color-accurate green color according to printing technique 300, first printed layer 310 may be printed using the configuration of print heads 330. As part of print heads 330, cyan cartridge 331, yellow cartridge 333, and white cartridges 332 and 334 may be used to eject droplets of white ink 336 as well as droplets of cyan ink 335 and yellow ink 337. While two white cartridges 332, 334 are depicted, there may be one or more white cartridges in printer 100 as described above with reference to FIG. 2. In FIG. 4, white cartridges 332 and 334 are depicted qualitatively as ejecting more white ink 336 than cyan cartridge 331 is ejecting of cyan ink 335, and yellow cartridge 333 is ejecting of yellow ink 337. First layer 310 may thus have the highest opacity of the layers printed according to printing technique 300 (and hence the largest amount of printed white ink), though it may not be completely white. In first layer 310, the comparatively smaller amounts of printed translucent cyan ink 335 and translucent yellow ink 337 intermix with the opaque white ink 336 to form layer 310.

Still referring to FIG. 4, second printed layer 312 may be printed using the configuration of print heads 340. As part of print heads 340, cyan cartridge 331, yellow cartridge 333, and white cartridges 332 and 334 may be used to eject droplets of white ink 346 as well as droplets of cyan ink 345 and yellow ink 347. In FIG. 4, white cartridges 332 and 334 are still depicted as qualitatively ejecting more white ink 346 than cyan cartridge 331 is ejecting of cyan ink 345, and yellow cartridge 333 is ejecting of yellow ink 347. Second layer 312, however, may comprise less white ink 346 than first layer 310 comprises white ink 336. That is, second layer 312 contains more translucent color ink than first layer 310, and the opacity of first layer 310 may be greater than the opacity of second layer 312. In second layer 312, a greater amount of printed translucent cyan ink 345 and translucent yellow ink 347 intermix with the opaque white ink 346, although layer 312 may still comprise a majority of white ink 346.

Still referring to FIG. 4, third printed layer 314 may be printed using the configuration of print heads 350. As part of print heads 350, cyan cartridge 331, yellow cartridge 333, and white cartridges 332 and 334 may be used to eject droplets of white ink 356 as well as droplets of cyan ink 355 and yellow ink 357. Now, white cartridges 332 and 334 are no longer depicted as ejecting more white ink 356 than cyan cartridge 331 is ejecting of cyan ink 355, and yellow cartridge 333 is ejecting of yellow ink 357. Third layer 314, like second layer 312, may comprise less white ink 356 than second layer 312 comprises white ink 346. That is, third layer 314 may comprise even more color ink than second layer 312, which in turn may comprise more color ink than first layer 310. Moreover, the opacity of second layer 312 printed according to printing technique 300 may be greater than the opacity of third layer 314. In third layer 314, an even greater amount of printed translucent cyan ink 355 and translucent yellow ink 357 intermix with the opaque white ink 356, and layer 314 thus comprises a majority of color ink.

Still referring to FIG. 4, fourth printed layer 316 may be printed using the configuration of print heads 360. As part of print heads 360, cyan cartridge 331, yellow cartridge 333, and white cartridges 332 and 334 may be used to eject droplets of white ink 366 as well as droplets of cyan ink 365 and yellow ink 367. Now, white cartridges 332 and 334 eject substantially less white ink 356 than cyan cartridge 331 is ejecting of cyan ink 365, and yellow cartridge 333 is ejecting of yellow ink 367. Fourth layer 316 may comprise less white ink 366 than third layer 314 comprises white ink 356. That is, fourth layer 316 may comprise even more color ink than third layer 314, which in turn may comprise more color ink than second layer 312, which in turn may comprise more color ink than first layer 310. Moreover, the opacity of third layer 314 printed according to printing technique 300 may be greater than the opacity of fourth layer 316. In fourth layer 316, an even greater amount of printed translucent cyan ink 365 and translucent yellow ink 367 intermix with the opaque white ink 366, and layer 316 thus comprises a greater majority of color ink than third layer 312.

Thus, technique 300 shown in FIG. 4 does not require printing of separate or underlying layers of white to simulate, reproduce, or create a white substrate via printed ink. Technique 300 shown in FIG. 4 may produce one or more color-accurate colors printed additively through layers of varying ratios of intermixed translucent color inks and opaque white inks. In the example shown in FIG. 4, color-accurate green color may be produced through the printing of layers 310, 312, 314, and 316. The ratio of intermixed translucent color inks to opaque white inks shown in the layers of FIG. 4 may vary from low to high through each of four layers 310, 312, 314, and 316. Thus, reflection of visible light may occur through one or more of four layers 310, 312, 314, and 316, because there may be a portion of each of these layers comprising both translucent and opaque characteristics. The number of printed layers and the ratios of color to white inks therein may be calculated in order to achieve printing of desired color-accurate colors, such as color-accurate green used in the example of FIG. 4. The color-accurate green color achieved through layers 310, 312, 314, and 316, for example, may be observed by viewing light reflected from one or more of the layers and passing to an observer's eyes. Even though achievement of color-accurate green color is used in the example described with reference to FIG. 4, any color or colors may be printed on a nonwhite substrate using the CMYK color model or palette with printing technique 300. Such color may then be subsequently observed, without requiring the presence of a white substrate underlying the printed color layers.

Thus, as described with reference to FIG. 4, and consistent with an embodiment, printing technique 300 may not require printing of many extra layers of ink and may not require printing of white ink layers to effect a white substrate. Printing technique 300 thus reduces printing time, the number of printed layers, and may achieve color-accurate color printing using less ink than with existing technique 200. Moreover, if the final printed color layer is scratched, abraded, or otherwise damaged or marred, the printed color may only be partially removed in the region of the scratch, abrasion, or mar. Thus, even if one or more of the underlying printed layers would be exposed, each underlying layer still comprises a percentage of color ink and may thereby display only a low contrast between the scratched color layer and one or more layers immediately above or below. Thus, the cost to print on a nonwhite substrate using the technique 300 is lower than that existing technique 200, and achieves a final printed color-accurate color that exhibits less contrast change when scratched, abraded, or otherwise damaged or marred.

Figure 5:
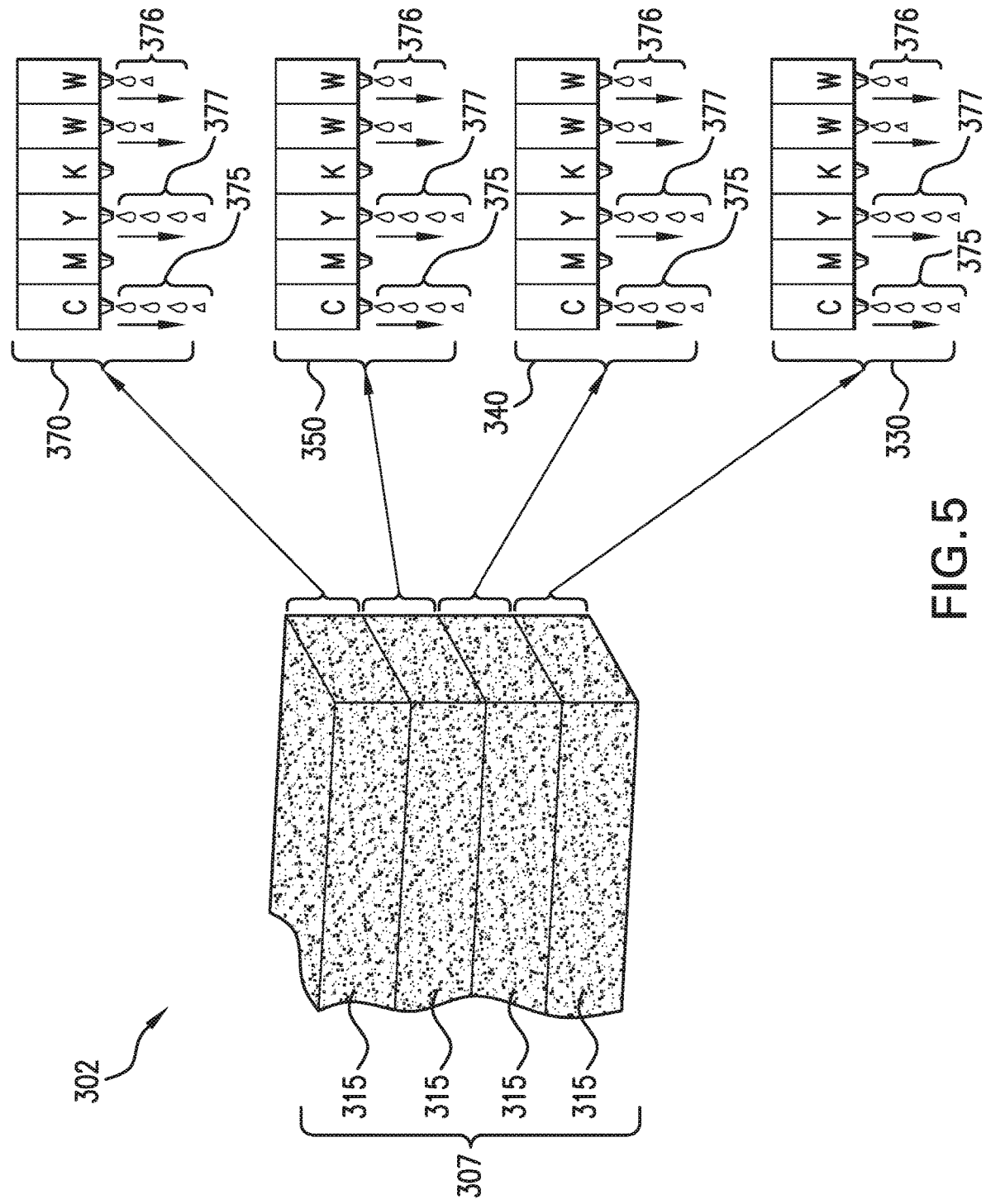
FIG. 5 shows a perspective view of another exemplary sequence of printed layers printed consistent with an embodiment of the disclosure, the printed layers producing a color-accurate green color ink over a nonwhite substrate, along with a depiction of the printheads and relative amounts of ink used for each of the respective printed layers.

Consistent with an embodiment, FIG. 5 shows a perspective view of another exemplary sequence of printed ink layers that produce a color-accurate color over a nonwhite substrate, along with a depiction of the printheads used for each of the respective printed layers according to printing technique 302. As will be described with reference to FIG. 5, printing technique 302 differs from known techniques in that printer 100 may print white ink at the same time as color ink similar to the embodiment described above with respect to FIG. 4. Consistent with an embodiment, the printed pattern of ink droplets printed according to printing technique 302 may also comprise a stochastic dot pattern, chaotic in nature, which is mixed on demand, mixing with itself either as the ink is ejected onto the substrate or immediately upon printing onto the substrate. The printed white ink and color ink may thus intermix upon printing onto a substrate, analogous to what the print industry may identify as a solid color or spot color. The intermixed and printed white and color inks are mixed upon printing onto a substrate in a manner analogous to house paint, such that printing multiple layers of this intermixed white and color inks builds up opacity over the course of multiple printed layers. This built-up opacity avoids the need to simulate or reproduce a white substrate underneath the printed color layer, in contrast to known printing technique 200, and allows for printing color-accurate colors on nonwhite substrates with fewer printed layers and less ink used.

As shown in FIG. 5, portions of multiple printed layers 307 printed using printer 100 are shown in perspective view. Layers 307 comprise four layers of printed material 315. Four layers of intermixed white and color inks are shown in the example of FIG. 5, although more or less layers may be printed to achieve printing of a desired color-accurate color. The desired color-accurate color for printing will thus be built-up over the course of printing each of layers 315 by repeating the printing of a predetermined ratio of white ink to color ink in each successive printed layer. That is, the ratio of white ink to color ink in the first printed layer may be less than or equal to 1:1, and this may be the same ratio applied to any number of successively printed layers of multiple printed layers 307. Details of printing technique 302 will be further described below.

In contrast to existing technique 200, the final printed layer 315 of multiple layers 307 printed according to printing technique 302 does not have to be the final desired color-accurate color printed according to the CMYK model. That is, printing technique 302, like printing technique 300 describe with respect to FIG. 4, does not require that the uppermost printed layer solely be the color-accurate color as a standalone printed layer. Rather, it is the combination of each of the layers of multiple layers 307 that, when taken together, create the color-accuracy for a desired color printed according to the CMYK model. Because each of the layers of multiple layers 307 comprise intermixed translucent color ink and opaque white ink, the mixture of translucency and opacity of the various components of the printed layers work in concert to achieve observable color-accuracy of the final desired printed color. This may be observed visually as well as during instrument testing of printed colors when considering visible light passing through and reflecting back from multiple layers 307. This will be later described in more detail with reference to FIG. 14.

Still referring to FIG. 5, a depiction of print cartridges or heads 330, 340, 350, and 360 shows the inks used to respectively print the exemplary four layers comprising multiple layers 307. For example, to print an exemplary color-accurate green color according to printing technique 302, first printed layer 315 of multiple layers 307 may be printed using the configuration of print heads 330. As part of print heads 330, cyan cartridge 331, yellow cartridge 333, and white cartridges 332 and 334 may be used to eject droplets of white ink 376 as well as droplets of cyan ink 375 and yellow ink 377. While two white cartridges are again depicted (similar to FIG. 4), there may be one or more white cartridges in printer 100 as described above with reference to FIG. 2. In FIG. 5, printing technique 302 qualitatively uses more white ink 376 than cyan ink 375, and yellow ink 377. First printed layer 315 of multiple layers 307 may thus have a ratio of white ink to color ink producing an opacity in between the opacity of layers 314 and 316 shown in FIG. 4, and may not be completely white. For example, first printed layer 315 of multiple layers 307 may have a ratio of white ink to color ink being less than or equal to 1:1.

Moreover, second, third, and fourth printed layers 315 of multiple layers 307 shown in FIG. 5 may have the same ratio of white ink to color ink as that of first printed layer 315.

Thus, technique 302 shown in FIG. 5 likewise does not require printing of separate or underlying layers of white to simulate, reproduce, or create a white substrate via printed ink. Technique 302 shown in FIG. 5, similar to technique 300 shown in FIG. 4, may produce one or more color-accurate colors printed additively through layers comprising one or more predetermined ratios of intermixed translucent color inks and opaque white inks. In the example shown in FIG. 5, color-accurate green color may be produced through the printing of layers 315 of multiple printed layers 307. The ratio of intermixed translucent color inks to opaque white inks shown in the layers of FIG. 5 may thus be the same ratio in each of the layers 315 of multiple printed layers 307. Thus, reflection of visible light may occur through one or more of the four layers 315 shown in FIG. 5, because there may be a portion of each of these layers comprising both translucent and opaque characteristics. The number of printed layers and the ratios of color to white inks therein may be calculated in order to achieve printing of desired color-accurate colors, such as color-accurate green used in the example of FIG. 5. The color-accurate green color achieved through multiple layers 307, for example, may be observed by viewing light reflected from one or more of the layers and passing to an observer's eyes. Even though achievement of color-accurate green color is used in the example described with reference to FIG. 5, any color or colors may be printed on a nonwhite substrate using the CMYK color model or palette with printing technique 302. Such color may then be subsequently observed, without requiring the presence of a white substrate underlying the printed color layers.

Thus, as described with reference to FIG. 5, and consistent with an embodiment, printing technique 302 may not require printing of many extra layers of ink and may not require printing of white ink layers to effect a white substrate. Printing technique 302 thus reduces printing time, the number of printed layers, and may achieve color-accurate color printing using less ink than with existing technique 200. Moreover, if the final printed color layer is scratched, abraded, or otherwise damaged or marred, the printed color may only be partially removed in the region of the scratch, abrasion, or mar. Thus, even if one or more of the underlying printed layers of multiple layers 307 would be exposed, each underlying layer 315 still comprises a percentage of color ink and may thereby display only a low contrast between the scratched color layer and one or more layers immediately above or below. Thus, the cost to print on a nonwhite substrate using the technique 302 is lower than that existing technique 200, and achieves a final printed color-accurate color that exhibits less contrast change when scratched, abraded, or otherwise damaged or marred.

Figure 6:
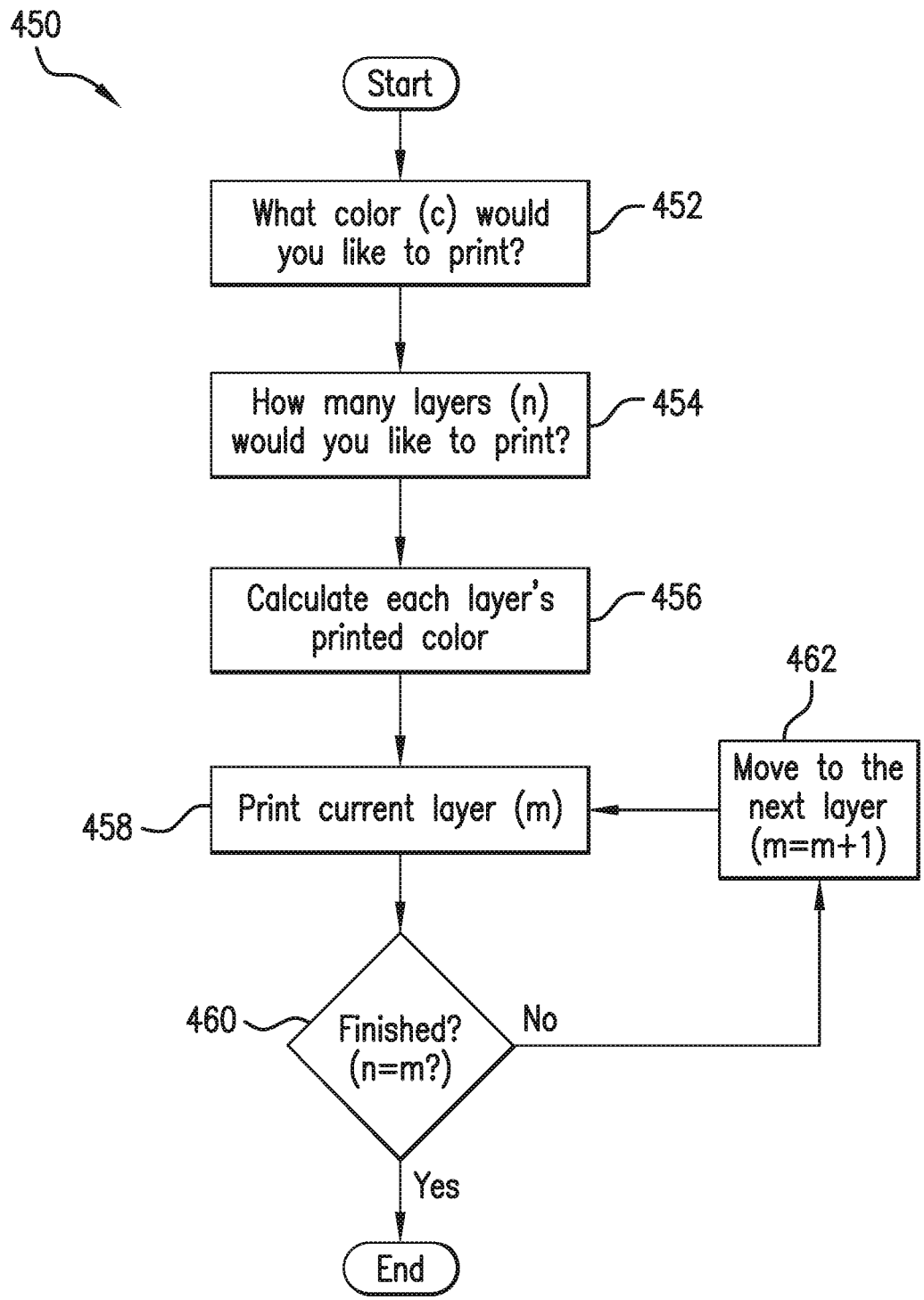
FIG. 6 shows a process for printing a selected color-accurate color onto a nonwhite substrate over multiple printed layers, consistent with an embodiment of the disclosure.

As shown in FIG. 6, and consistent with an embodiment, an exemplary generalized process 450 for printing color-accurate CMYK colors on nonwhite substrates begins with step 452. Some or all steps in process 450 may be completed by a footwear, apparel, or equipment manufacturer or proprietor. In other cases, some steps described below may be accomplished by a manufacturer and other steps may be accomplished by another party including another manufacturer, proprietor, retailer, or any other entity. In some cases, one or more of the steps may be optional. In other cases, some steps may be completed in a different order. Referring to FIG. 5, in step 452, a desired translucent color (c) for printing is selected. Color (c) may be any color-accurate color that can be printed using the CMYK color model. In step 454, a desired number of layers (n) for printing is selected, for printing the color-accurate color.

Still referring to FIG. 6, in step 456, each layer's printed color is calculated based on the number of layers (n). In step 458, the current layer (m) is printed. In step 460, progress of color printing may be evaluated to verify whether printing is finished (n=m). If printing is finished, then process 450 is complete. In step 460, if printing is not finished, then process 450 may proceed to step 462. In step 462, printing may continue with the next layer (m=m+1) and return to step 458.

Figure 7:
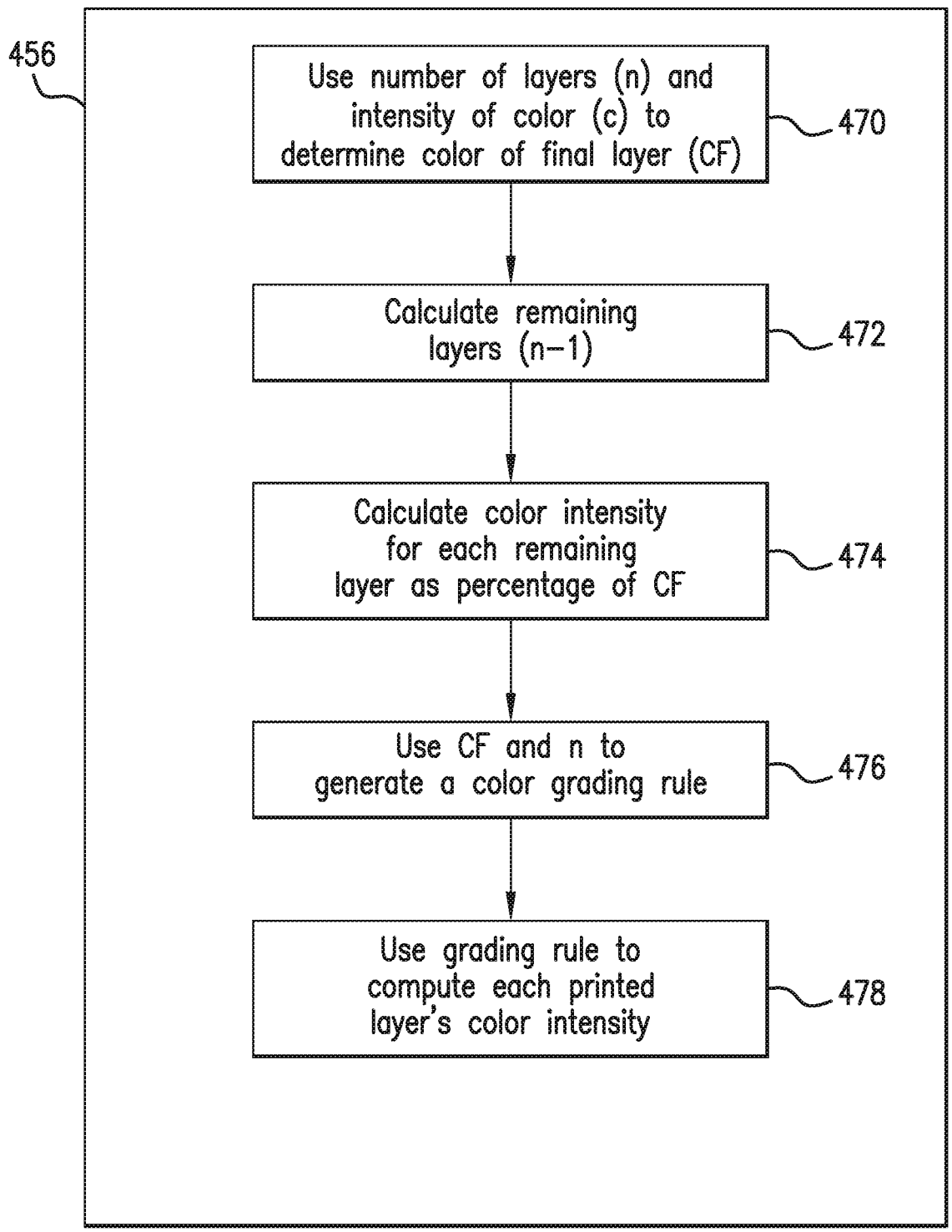
FIG. 7 shows a part of the process of printing a selected color-accurate color of FIG. 6, consistent with an embodiment of the disclosure.

As shown in FIG. 7, step 456 is explained in greater detail. In step 470, the number of layers (n) and intensity of color (c) are used to determine the color of the final layer (CF). In step 472, the remaining number of layers (n−1) is calculated. Then, in step 474, the color intensity for each remaining layer is calculated as a percentage of CF. In step 476, CF and n are used to generate a color grading rule. In step 478, the grading rule is used to compute each printed layer's color intensity. Graphical examples of the grading rule are shown in FIGS. 8 and 9.

Figure 8:
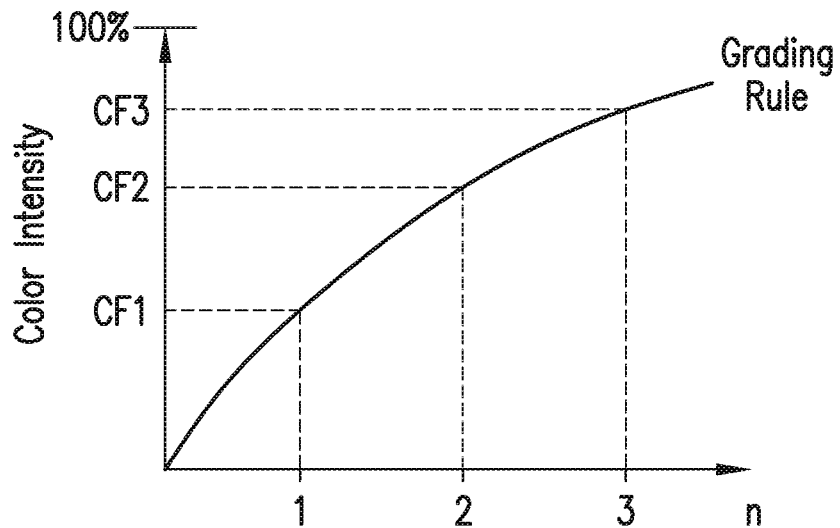
FIG. 8 shows a graphical representation of a calculated grading rule for printing layers of different color intensity, consistent with an embodiment of the disclosure.

Referring to FIG. 8, and consistent with an embodiment, a graphical representation of a grading rule is shown for the case when three layers may be printed to achieve a color-accurate printed color. In the graphical representation, the grading rule may be shown as a logarithmic function. The grading rule, however, may be a linear function, logarithmic function, exponential function, parabolic function, or any other sequence or expression, depending on the desired color for printing. Still referring to FIG. 8, each layer's color intensity may be a percentage of the desired CF, based on the number of layers printed. For example, as shown in FIG. 8, when three layers are printed, CF1 is the percentage of color intensity for the first printed layer n=1. Similarly, CF2 is the percentage of color intensity for the second printed layer n=2; and CF3 is the percentage of color intensity for the third printed layer n=3. Because multiple layers are printed, the color intensity in each of the layers n=1, 2, 3 will be lower than the desired CF due to the additive nature of printing a percentage of color in each printed layer.

Figure 9:
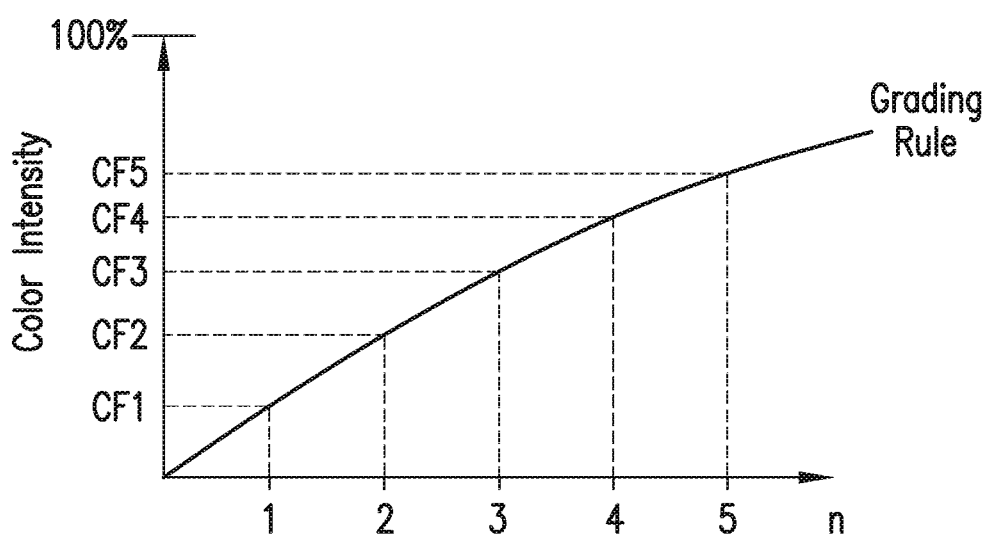
FIG. 9 shows another graphical representation of a calculated grading rule for printing layers of different color intensity, consistent with an embodiment of the disclosure.

Referring to FIG. 9, and consistent with an embodiment, another graphical representation of a grading rule is shown for the case when five layers may be printed to achieve a color-accurate printed color. In the graphical representation, the grading rule may be shown as a logarithmic function. The grading rule, however, may be a linear function, logarithmic function, exponential function, parabolic function, or any other sequence or expression, depending on the desired color for printing. Still referring to FIG. 9, each layer's color intensity may be a percentage of the desired CF, based on the number of layers printed. For example, as shown in FIG. 9, when five layers are printed, CF1 is the percentage of color intensity for the first printed layer n=1. Similarly, CF2 is the percentage of color intensity for the second printed layer n=2; CF3 is the percentage of color intensity for the third printed layer n=3; CF4 is the percentage of color intensity for the fourth printed layer n=4; and CF5 is the percentage of color intensity for the fifth printed layer n=5. Because multiple layers are printed, the color intensity in each of the layers n=1, 2, 3, 4, 5 will be lower than the desired CF due to the additive nature of printing a percentage of color in each printed layer. In addition, the graphical representations in FIGS. 8 and 9 show, for example, that the grading rule curve may have a more shallow slope as the number of printed layers (n) increases. That is, each of CF1, CF2, CF3, CF4, and CF5 may be a smaller percentage of CF in the case of printing five layers, whereas CF1, CF2, and CF3 may be a larger percentage of CF in the case of printing only three layers.

As shown and described with reference to FIGS. 4-9, and consistent with an embodiment, CF may be a high percentage of the desired color-accurate final color C. For example, if n=3, then CF may be approximately 95% of C; if n=4, then CF may be approximately 90% of C; if n=5, then CF may be approximately 85% of C, etc. These percentages may also vary not just based on the number of layers printed, but may also vary depending on the selected color-accurate CMYK color for printing. For example, printing of lighter colors, such as pink (described later with reference to FIG. 12), may call for CF to be an even higher percentage of C (pink). Conversely, for example, printing of darker colors, such as dark blue, may call for CF to be an overall lower percentage of C (dark blue). Moreover, in the case of the embodiment described above with respect to FIG. 5, the color intensity in each of the printed layers may be lower than the desired CF at a predetermined intermediate value being substantially equal in each of the printed layers n, due to the additive nature of printing a percentage of color in each printed layer.

Figure 10:
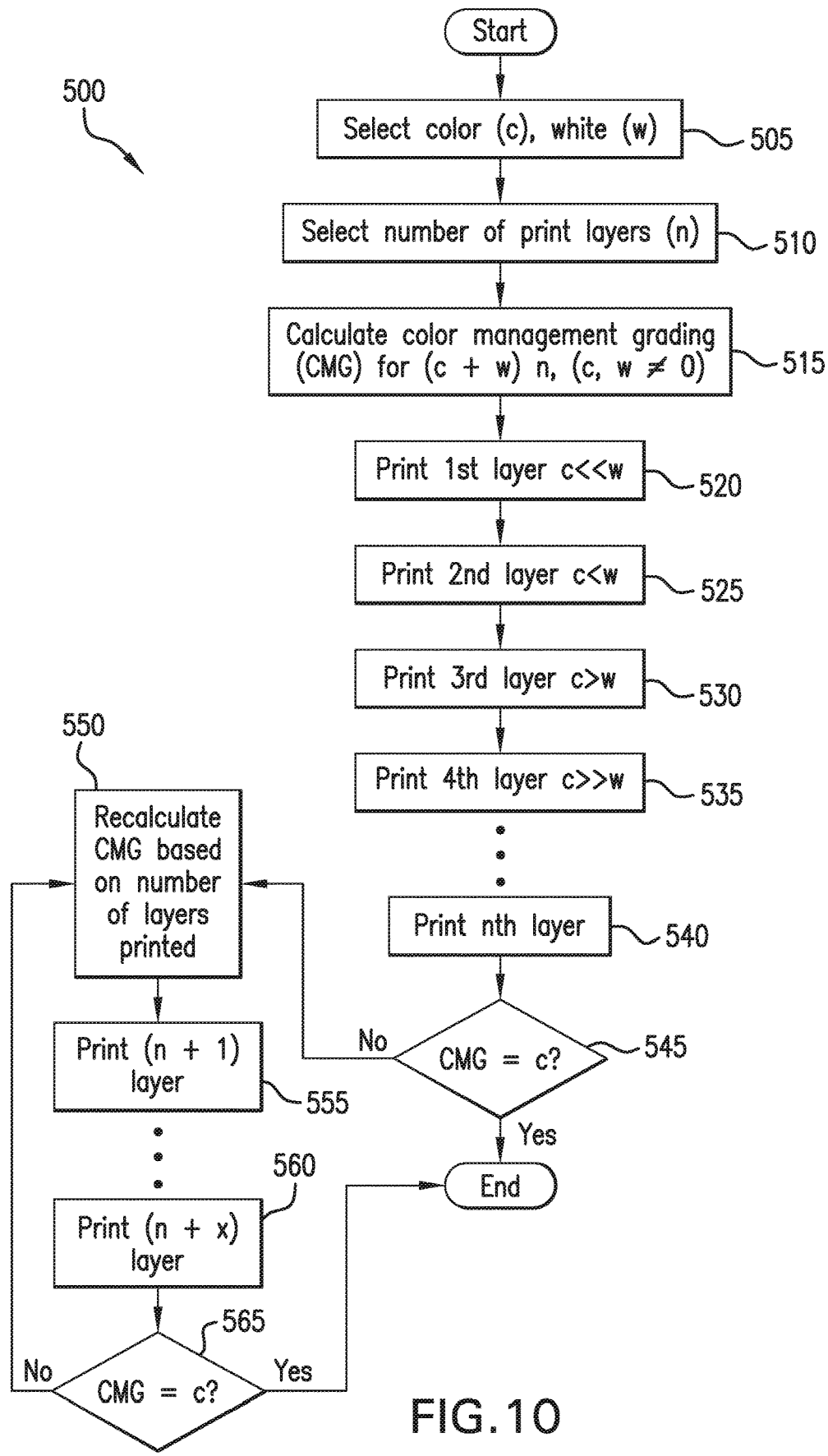
FIG. 10 shows a process for printing a selected color-accurate color onto a nonwhite substrate, consistent with an embodiment of the disclosure.

As shown in FIG. 10, and consistent with an embodiment, another exemplary generalized process 500 for printing color-accurate CMYK colors on nonwhite substrates begins with step 505. Some or all steps in process 500 may be completed by a footwear, apparel, or equipment manufacturer or proprietor. In other cases, some steps described below may be accomplished by a manufacturer and other steps may be accomplished by another party including another manufacturer, proprietor, retailer, or any other entity. In some cases, one or more of the steps may be optional. In other cases, some steps may be completed in a different order. Referring to FIG. 10, in step 505, a desired translucent color (c) for printing is selected, along with an opaque white (w). Color (c) may be any color-accurate color that can be printed using the CMYK color model. In step 510, a desired number of print layers (n) is selected, for printing the color-accurate color.

Still referring to FIG. 10, in step 515, color management grading (CMG) is calculated, using a computer, for printed color and white inks as a function of the number of printed layers. That is, (c+w)n, where (c, w≠0). In step 515, the calculated CMG provides that each printed layer comprises a combination of printed translucent color and opaque white inks, and that the ratio of color ink to white ink in each printed layer may vary as a function of the number of layers printed.

In step 520, a first layer of color ink and white ink is printed according to the calculated CMG, and the amount of color ink printed is much less than the amount of white ink printed. In step 525, a second layer of color ink and white ink is printed according to the calculated CMG, and the amount of color ink printed is less than the amount of white ink printed but more color is printed than that printed in step 520. In step 530, a third layer of color ink and white ink is printed according to the calculated CMG, and the amount of color ink printed is more than the amount of white ink printed, and more than that printed in step 525. In step 535, a fourth layer of color ink and white ink is printed according to the calculated CMG, and the amount of color ink printed is even more than the amount of white ink printed, as compared to that printed in step 530. The process thus continues to step 540, where the nth layer of color and white ink may be printed according to the calculated CMG, whereby the ratio of color ink to white ink may continue to increase with each successively printed layer. This exemplary process of printing varied ratios of white to color ink is analogous to the depiction shown, for example, in FIG. 4. Alternatively, for the nonlimiting depiction shown, for example, in FIG. 5, the ratio of color ink to white ink may be fixed at a predetermined and substantially identical intermediate value for each successively printed layer in steps 520, 525, 530, and 535.

In step 545, progress of color printing may be evaluated to verify whether the calculated CMG as printed through the nth layer equals the desired color-accurate CMYK color (c). If the number of printed layers of intermixed color and white ink produce a color-accurate desired CMYK color (c), then process 500 is complete. In step 545, if the calculated CMG as printed through the nth layer does not equal the desired color-accurate CMYK color (c), then process 500 may proceed to step 550.

In step 550, CMG may be recalculated based on the number of layers already printed in steps 520 through 540, in order to determine the number of additional printed layers that may be necessary to achieve the desired color-accurate CMYK color (c). In step 555, the (n+1)th layer of color ink and white ink is printed according to the recalculated CMG, whereby the ratio of color ink to white ink continues to increase. The process thus continues to step 560, where the (n+x)th layer of color and white ink is printed according to the recalculated CMG, whereby the ratio of color ink to white ink continues to increase.

In step 565, progress of color printing may be reevaluated to verify whether the recalculated CMG as printed through the (n+x)th layer equals the desired color-accurate CMYK color (c). If the number of printed layers of intermixed color and white ink produce a color-accurate desired CMYK color (c), then process 500 is complete. In step 565, if the recalculated CMG as printed through the (n+x)th layer does not equal the desired color-accurate CMYK color (c), then process 500 may proceed back to step 550.

Figure 11:
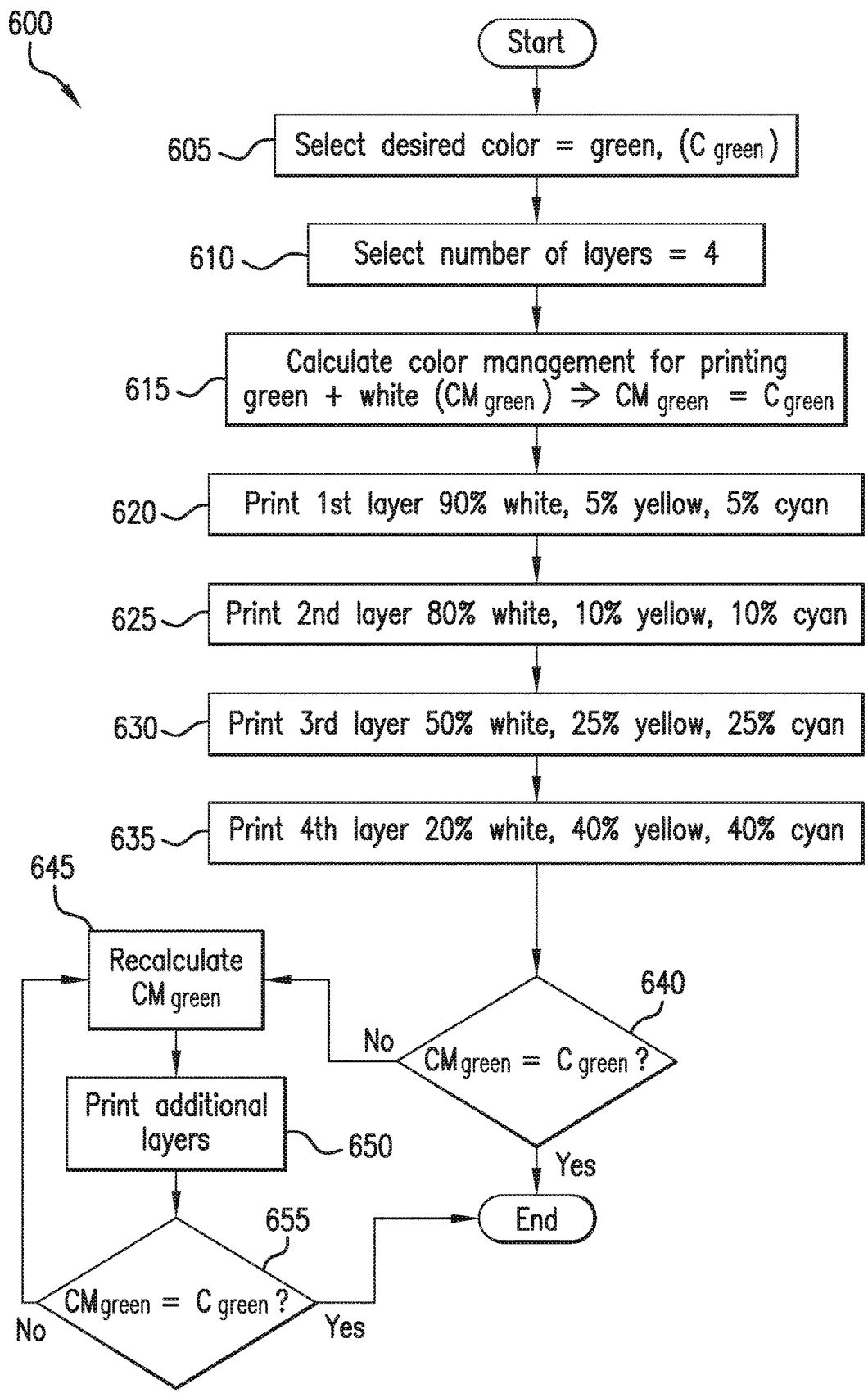
FIG. 11 shows a process for printing an exemplary color-accurate green color onto a nonwhite substrate, consistent with an embodiment of the disclosure.

As shown in FIG. 11, and consistent with an embodiment, exemplary process 600 is described for printing color-accurate green color on nonwhite substrates, which begins with step 605. Some or all steps in process 600 may be completed by a footwear, apparel, or equipment manufacturer or proprietor. In other cases, some steps described below may be accomplished by a manufacturer and other steps may be accomplished by another party including another manufacturer, proprietor, retailer, or any other entity. In some cases, one or more of the steps may be optional. In other cases, some steps may be completed in a different order. Still referring to FIG. 11, in step 605, a desired color-accurate green color (C-green) for printing is selected. C-green may be a color-accurate green that can be printed using the CMYK color model. In step 610, four layers of printing are selected for printing the color-accurate C-green.

Still referring to FIG. 11, in step 615, color management grading for color-accurate green (CM-green) is calculated, using a computer, for printed color and white inks as a function of four layers selected for printing. In process 600, CM-green equals C-green. That is, the color to be printed over the selected four layers to achieve CM-green will be indistinguishable by viewing from color-accurate green color (C-green) printed by known techniques. In step 615, the calculated CM-green provides that each printed layer comprises a percentage of printed translucent color inks and a percentage of printed opaque white inks, such that the ratio of color ink to white ink in each printed layer varies as a function of the number of layers printed.

In step 620, a first layer of ink is printed according to the calculated CM-green, and in this example the first layer of ink printed comprises 90% opaque white ink, 5% translucent cyan ink, and 5% translucent yellow ink. In step 625, a second layer of ink is printed according to the calculated CM-green, and in this example the second layer of ink printed comprises 80% opaque white ink, 10% translucent cyan ink, and 10% translucent yellow ink. The amount of color ink printed in the second layer is thus greater than the amount of color ink printed in the first layer. In step 630, a third layer of ink is printed according to the calculated CM-green, and in this example the third layer of ink printed comprises 50% opaque white ink, 25% translucent cyan ink, and 25% translucent yellow ink. In step 635, a fourth layer of ink is printed according to the calculated CM-green, and in this example the fourth layer of ink printed comprises 20% opaque white ink, 40% translucent cyan ink, and 40% translucent yellow ink. Alternatively, similar to the nonlimiting depiction shown, for example, in FIG. 5, the ratio of color ink to white ink may be fixed at a predetermined and substantially identical intermediate value for each successively printed layer in steps 620, 625, 630, and 635. For example, each layer of printed ink may alternatively comprise approximately 35% opaque white ink, approximately 32.5% translucent cyan ink, and approximately 32.5% translucent yellow ink, or another desired percentage between that of steps 630 and 635, to achieve the same C-green.

In step 640, progress of color printing the color-accurate C-green may be evaluated to verify whether CM-green equals C-green. If CM-green equals C-green, meaning color-accurate green is visible on the printed nonwhite substrate, then process 600 is complete. In step 645, if the calculated CM-green does not equal C-green, then process 600 may proceed to step 645.

In step 645, CM-green may be recalculated based on the four layers already printed in steps 620 through 635, in order to determine the number of additional printed layers that may be necessary to achieve the desired color-accurate C-green. In step 650, one or more additional layers of color and white ink may be printed according to the recalculated CM-green. The process thus continues to step 655, where the progress of color printing may be reevaluated to verify whether the recalculated CM-green equals C-green. If CM-green equals C-green, meaning color-accurate green is visible on the printed nonwhite substrate, then process 600 is complete. In step 655, if the calculated CM-green does not equal C-green, then process 600 may proceed back to step 645.

Figure 12:
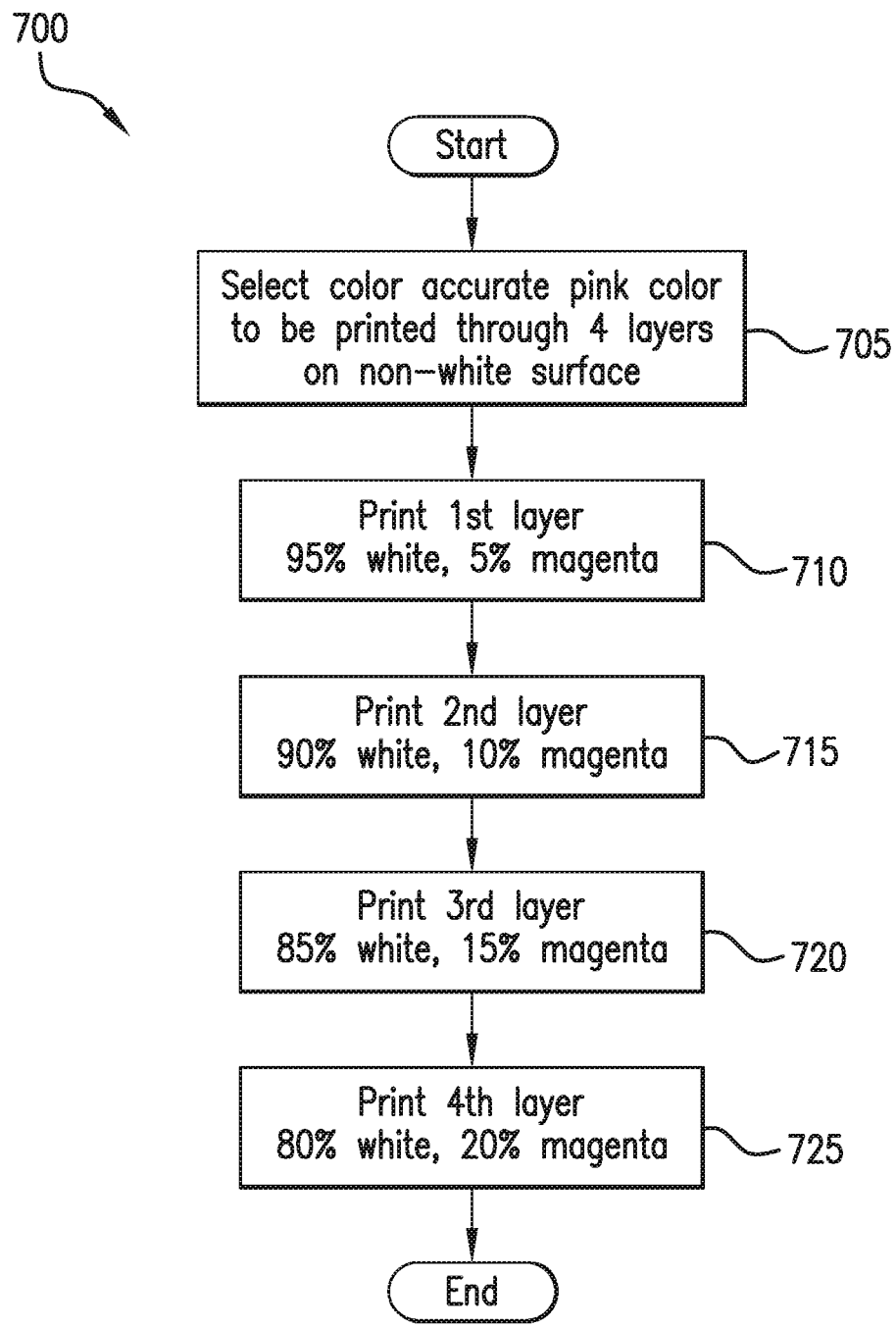
FIG. 12 shows a process for printing an exemplary color-accurate pink color onto a nonwhite substrate, consistent with an embodiment of the disclosure.

As shown in FIG. 12, and consistent with an embodiment, exemplary process 700 is described for printing color-accurate pink color on nonwhite substrates, which begins with step 705. Some or all steps in process 700 may be completed by a footwear, apparel, or equipment manufacturer or proprietor. In other cases, some steps described below may be accomplished by a manufacturer and other steps may be accomplished by another party including another manufacturer, proprietor, retailer, or any other entity. In some cases, one or more of the steps may be optional. In other cases, some steps may be completed in a different order. Still referring to FIG. 12, in step 705, a desired color-accurate pink color for printing is selected for printing over the course of four layers of intermixed translucent color inks and opaque white ink onto a nonwhite substrate. The selected pink color may be a color-accurate pink that can be printed using the CMYK color model.

Still referring to FIG. 12, in step 710, a first layer of ink is printed comprising 95% opaque white ink and 5% translucent magenta ink. In step 715, a second layer of ink is printed comprising 90% opaque white ink and 10% translucent magenta ink. In step 720, a third layer of ink is printed comprising 85% opaque white ink and 15% translucent magenta ink. In step 725, a fourth layer of ink is printed comprising 80% opaque white ink and 20% translucent magenta ink.

Exemplary process 700 shown in FIG. 12 may thus be implemented based on varying percentages of translucent magenta ink and opaque white ink through the course of printing four layers of ink on a nonwhite substrate. Consistent with an embodiment, however, more or less layers of ink may be printed to achieve any desired color-accurate color in the CMYK color model. Alternatively, for example, and similar to the nonlimiting depiction shown in FIG. 5, the ratio of color ink to white ink may be fixed at a predetermined and substantially identical intermediate value for each successively printed layer in steps 710, 715, 720, and 725. For example, each layer of printed ink may alternatively comprise approximately 82.5% opaque white ink and approximately 17.5% translucent magenta ink to produce a color-accurate pink that can be printed using the CMYK color model.

Figure 13:
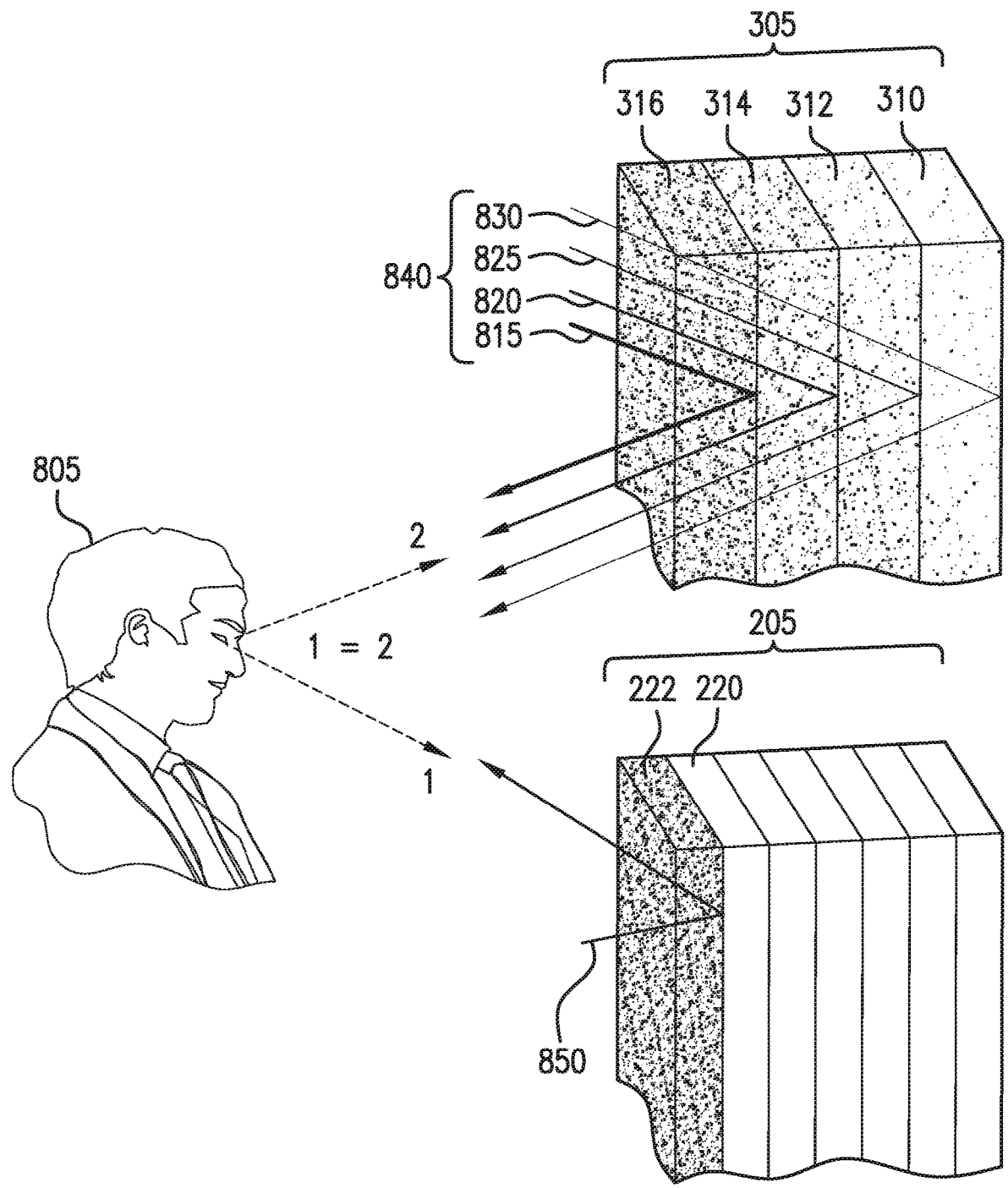
FIG. 13 shows a schematic view of an observer viewing an exemplary color-accurate color printed on a nonwhite substrate consistent with an embodiment of the disclosure, the color-accurate color appearing visually the same to the observer as that comparatively printed using a conventional printing technique.

Referring to FIG. 13, a printed surface printed according to one more techniques disclosed herein may be visually inspected or instrument tested and compared against a printed surface printed according to a known technique, when both surfaces are printed onto nonwhite substrates. Consistent with an embodiment, observer 805 may observe light reflected from multiple printed layers 305 printed using printer 100 shown and described with reference to FIG. 4. As shown in FIG. 4, layers 305 comprise four layers of printed material 310, 312, 314, and 316. As shown in FIG. 13, portions of incoming visible spectrum light 840 may pass through each of the four layers of printed material 310, 312, 314, and 316, and reflect back from one or more of these layers back to observer 805. This is because each of layers 310, 312, 314, and 316 comprise an intermixture of translucent cyan ink, translucent yellow ink, and opaque white ink.

Consistent with an embodiment, light 840 is shown in FIG. 13 divided into light rays 815, 820, 825, and 830. Light ray 815 may pass through uppermost printed layer 316 and reflect back through layer 316 to observer 805. Light ray 820 may pass through printed layers 316 and 314 and reflect back through layers 314 and 316 to observer 805. Light ray 825 may pass through printed layers 316, 314, and 312 and reflect back through layers 312, 314, and 316 to observer 805. Finally, light ray 830 may pass through printed layers 316, 314, 312, and 310 and reflect back through layers 310, 312, 314, and 316 to observer 805.

Because each of layers 310, 312, 314, and 316 comprise intermixed translucent color and opaque white inks, portions of light 840 may thus penetrate through all four printed layers, or may penetrate only through one or more printed layers. Thus, observer 805 will view a combination of light rays 840 reflected from more than one of layers 305 to form the observed color-accurate color. As also shown in FIG. 13, however, this contrasts with what observer 805 sees when viewing light 850 reflected from white layer 220 printed according to the existing technique shown in FIG. 3.

For example, in FIG. 13, an observer 805 may also observe light reflected from printed color layer 222 of layer 205 described with reference to known technique 200 of FIG. 3. As shown in FIG. 13, incoming visible spectrum light 850 may pass through color layer 222 of layers 205, and reflect off of the uppermost surface of white layer 220, because color layer 222 comprises translucent cyan and yellow inks while white layer 220 (and white layers 210 through 218) comprises opaque ink. That is, as described earlier with reference to the known technique of FIG. 3, observer 805 will be effectively viewing printed color present only in layer 222, because printing of underlying white layers is required by known techniques to create an underlying white substrate for color-accurate printing.

Still referring to FIG. 13, and demonstrating the efficacy of the disclosed printing techniques, observer 805 will nonetheless view each of reflected light 850 and 840 and see the same color. In the case of FIG. 13, drawn from the exemplary color printing techniques described with reference to FIG. 4 and in contrast with the known technique of FIG. 3, observer 805 will see color-accurate green color when viewing each of reflected light 850 and reflected light 840. That is, printing technique 300 described in FIG. 4 will produce color-accurate green color in a manner that is visually and instrument-testing indistinguishable from color-accurate green color printed with existing technique 200.

Figure 14:
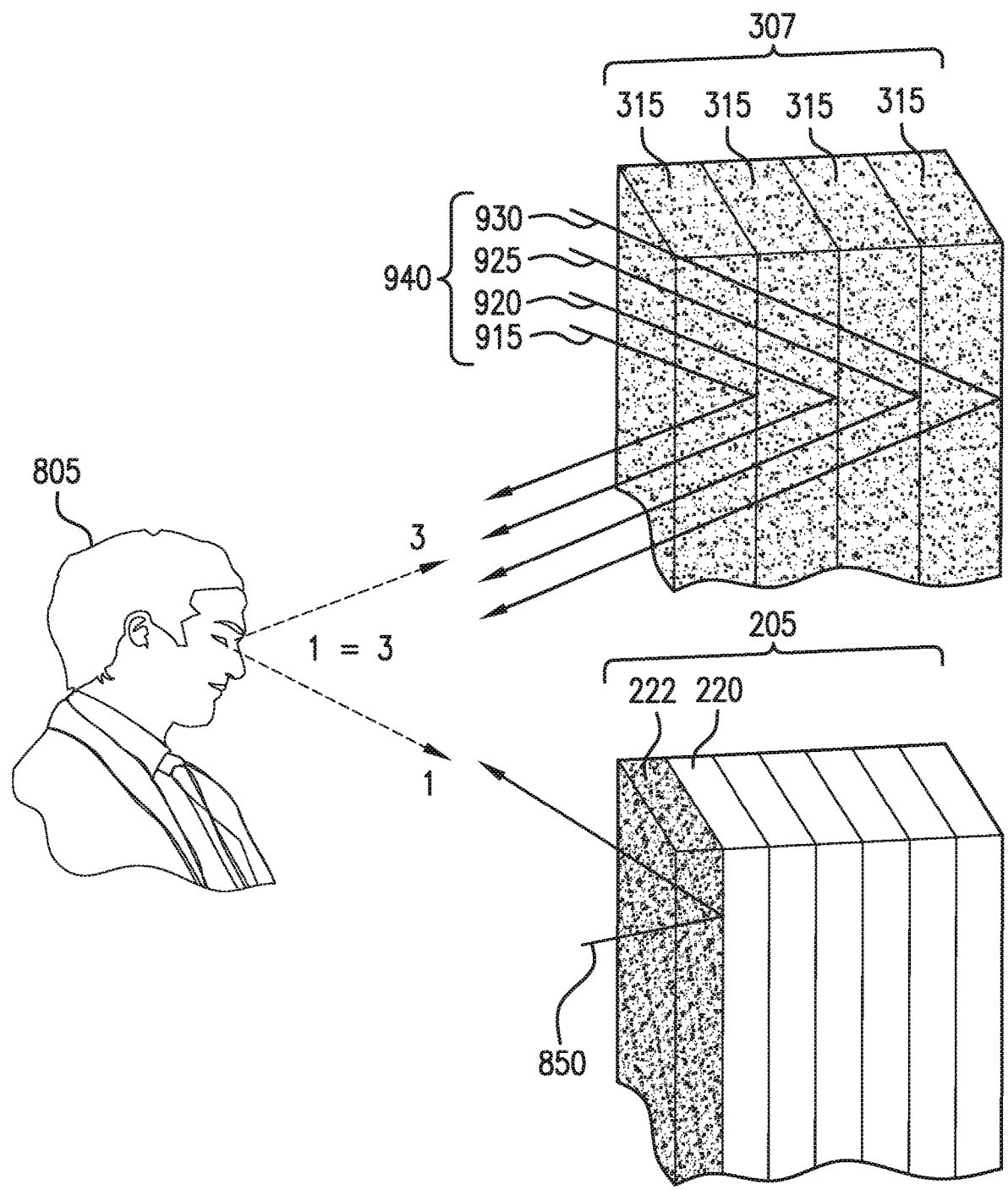
FIG. 14 shows a schematic view of an observer viewing an exemplary color-accurate color printed on a nonwhite substrate consistent with an embodiment of the disclosure, the color-accurate color appearing visually the same to the observer as that comparatively printed using a conventional printing technique.

Referring to FIG. 14, a printed surface printed according to one more techniques disclosed herein may be visually inspected or instrument tested and compared against a printed surface printed according to a known technique, when both surfaces are printed onto nonwhite substrates. Consistent with an embodiment, observer 805 may observe light reflected from multiple printed layers 307 printed using printer 100 shown and described with reference to FIG. 5. As shown in FIG. 4, layers 307 comprise four layers of printed material 315. As shown in FIG. 14, portions of incoming visible spectrum light 940 may pass through each of the four layers of printed material 315, and reflect back from one or more of these layers back to observer 805. This is because each of layers 315 comprise an intermixture of translucent cyan ink, translucent yellow ink, and opaque white ink.

Consistent with an embodiment, light 940 is shown in FIG. 14 divided into light rays 915, 920, 925, and 930. Light ray 915 may pass through uppermost printed layer 315 and reflect back through layer 315 to observer 805. Light ray 920 may pass through the first and second printed layers 315 and reflect back through those layers to observer 805. Likewise, light ray 925 may pass through the first, second, and third printed layers 315 and reflect back through those layers, as shown, to observer 805. Finally, light ray 930 may pass through the first, second, third, and fourth printed layers and reflect back through those layers, as shown, to observer 805.

Because each of the printed layers 315 forming multiple printed layers 307 may comprise a predetermined and substantially identical ratio of intermixed translucent color and opaque white inks, as shown in FIG. 5, portions of light 940 may thus penetrate through all four printed layers, or may penetrate only through one or more printed layers. Thus, observer 805 will view a combination of light rays 940 reflected from more than one of layers 307 to form the observed color-accurate color. As also shown in FIG. 14, however, and similar to that shown in FIG. 13, this contrasts with what observer 805 sees when viewing light 850 reflected from white layer 220 printed according to the existing technique shown in FIG. 3. For example, in FIG. 14 (and similar to what is shown in FIG. 13), an observer 805 may also observe light reflected from printed color layer 222 of layer 205 described with reference to known technique 200 of FIG. 3.

Still referring to FIG. 14, and demonstrating the efficacy of the disclosed printing techniques, observer 805 will nonetheless view each of reflected light 850 and 940 and see the same color. That is, for example, each of reflected light 850 and 940 will appear as the same color upon visual inspection and instrument testing of the printed layers. In the case of FIG. 14, drawn from the exemplary color printing techniques described with reference to FIG. 5 and in contrast with the known technique of FIG. 3, observer 805 will see color-accurate green color when viewing each of reflected light 850 and reflected light 940. That is, printing technique 302 described in FIG. 5 will produce color-accurate green color in a manner that is visually and instrument-testing indistinguishable from color-accurate green color printed with existing technique 200.

Figure 15:
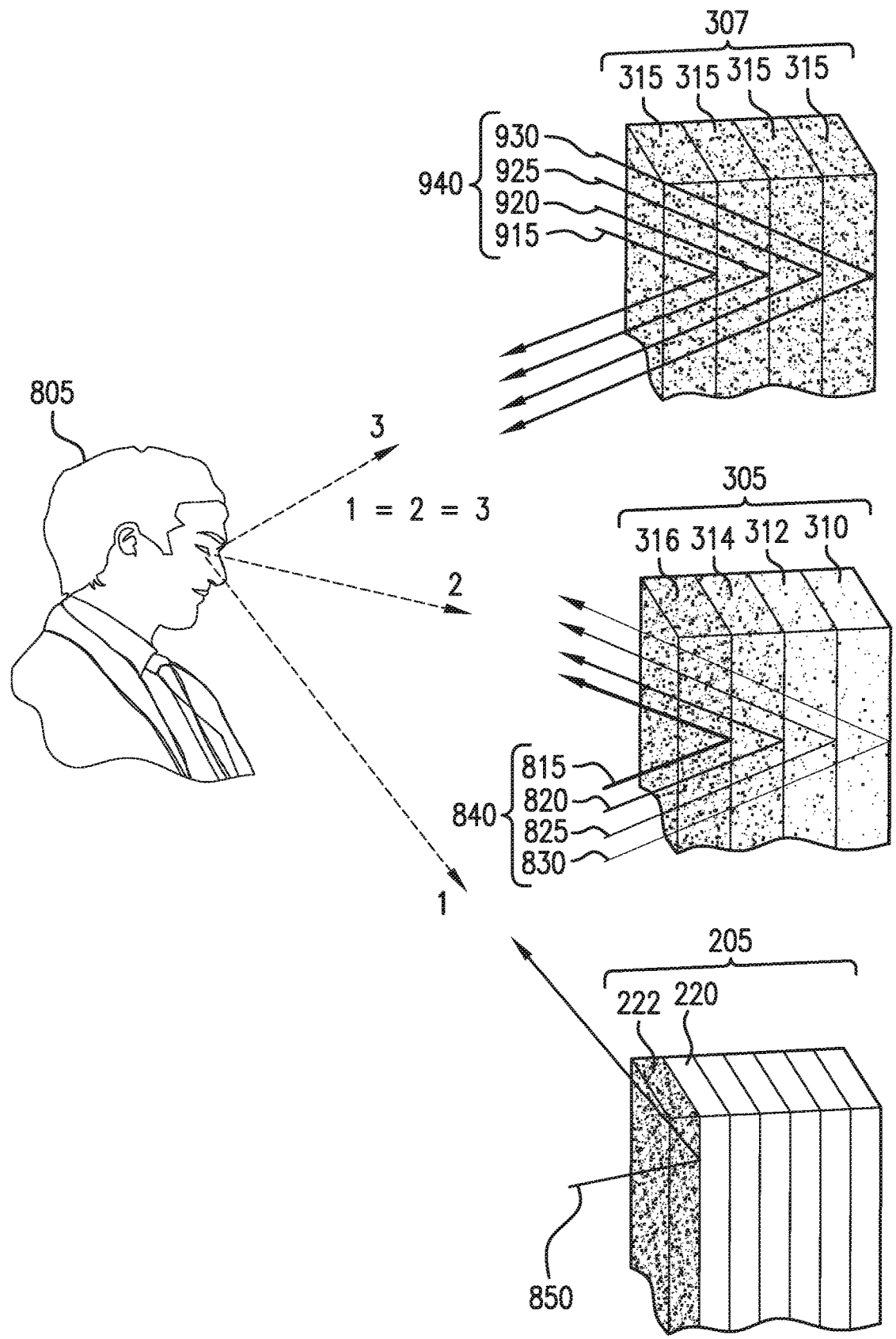
FIG. 15 shows a schematic view of an observer viewing an exemplary color-accurate color printed on a nonwhite substrate consistent with an embodiment of the disclosure as shown in FIGS. 13 and 14, the color-accurate color printed and shown in FIGS. 13 and 14 appearing visually the same to the observer as that comparatively printed using a conventional printing technique.

Referring to FIG. 15, and consistent with an embodiment, observer 805 may thus view each of reflected light 850, 840, and 940 and see the same color. In FIG. 15, drawn from the exemplary color printing techniques described with reference to FIGS. 4 and 5 and in contrast with the known technique of FIG. 3, observer 805 will see color-accurate green color when viewing each of reflected light 850, reflected light 840, and reflected light 940. That is, the printing techniques 300 and 302 described with reference to FIGS. 4 and 5 will produce color-accurate green color in a manner that is visually and instrument-testing indistinguishable from each other, as well as from the color-accurate green color printed with existing technique 200.

Figure 16:
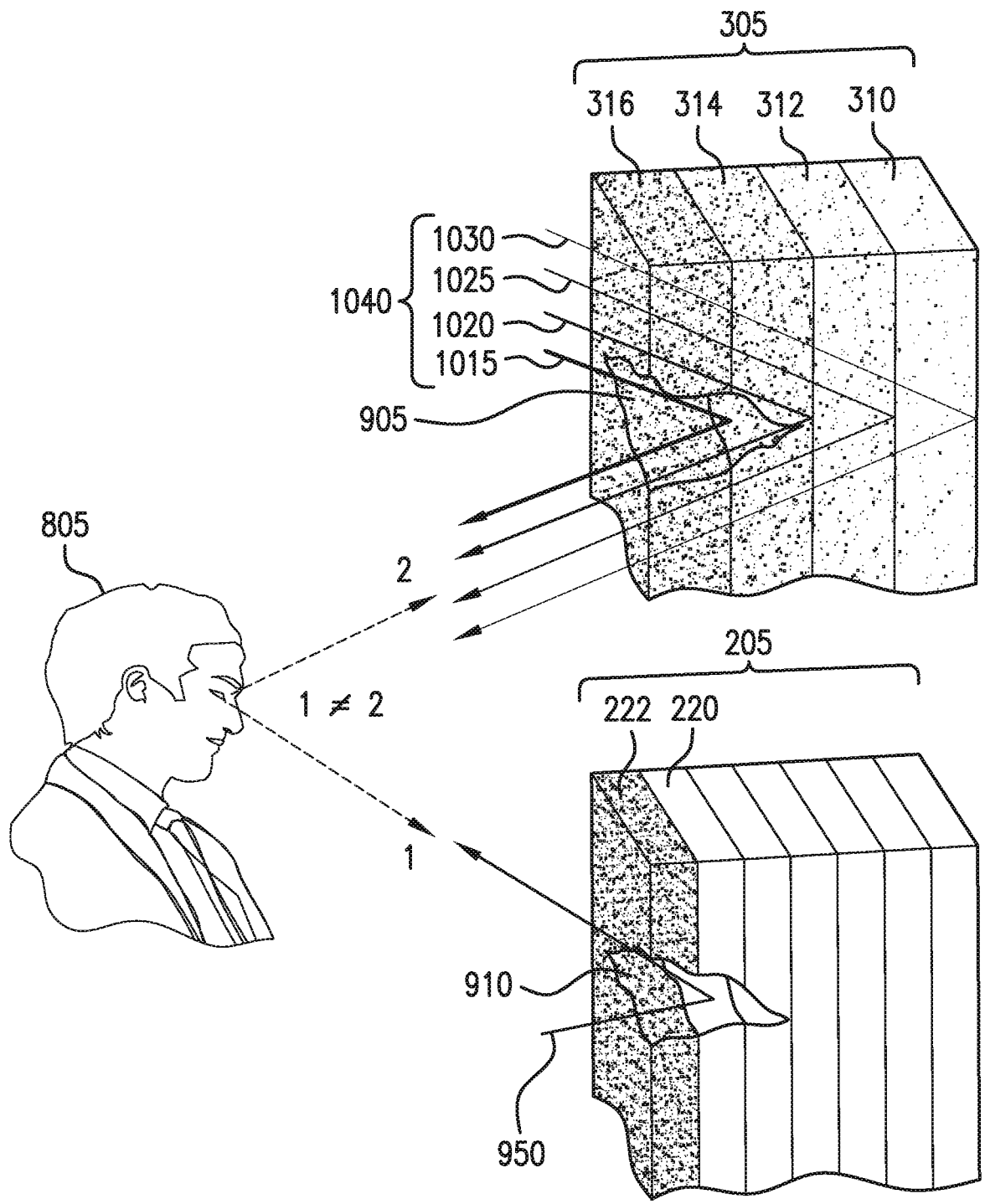
FIG. 16 shows a schematic view of an observer viewing an exemplary color-accurate color printed on a nonwhite substrate and having a scratch or crack embedded therein, consistent with an embodiment of the disclosure, the scratched color-accurate color appearing less visually noticeable to the observer as that of the scratched color comparatively printed using a conventional printing technique.

Referring to FIG. 16, and consistent with an embodiment, further benefits of the disclosed printing techniques will be discussed in the situation where the printed color surface may be scratched, abraded, or otherwise damaged or marred. As shown in FIG. 16, a printed surface printed according to one more techniques disclosed herein may be visually inspected and compared against a printed surface printed according to a known technique, when both surfaces are printed onto nonwhite substrates and when both surfaces contain as least one scratch, abrasion, or mar. For example, printed layers 305 may contain a scratch, abrasion, or mar 905, and printed layers 205 may likewise contain a substantially identical scratch, abrasion, or mar 910.

Still referring to FIG. 16, and consistent with an embodiment, observer 805 may observe light reflected from multiple printed layers 305 printed using printer 100 shown and described with reference to FIG. 4. As shown in FIG. 16, portions of incoming visible spectrum light 1040 may pass through each of the four layers of printed material 310, 312, 314, and 316, and reflect back from one or more of these layers back to observer 805. This is because each of layers 310, 312, 314, and 316 comprise an intermixture of translucent cyan ink, translucent yellow ink, and opaque white ink. Light 1040 may also pass through and be reflected from one or more portions of crack 905.

Consistent with an embodiment, light 1040 is shown in FIG. 16 divided into light rays 1015, 1020, 1025, and 1030. Light ray 1015 may pass through uppermost printed layer 316 and portion of crack 905 therein, and reflect back through layer 316 to observer 805. Light ray 1020 may pass through printed layers 316 and 314 and a portion of crack 905 therein, and reflect back through layers 314 and 316 to observer 805. Light ray 1025 may pass through printed layers 316, 314, and 312, and crack 905, and reflect back through layers 312, 314, and 316 to observer 805. Finally, light ray 1030 may pass through printed layers 316, 314, 312, and 310, and crack 905, and reflect back through layers 310, 312, 314, and 316 to observer 805.

Because each of layers 310, 312, 314, and 316 comprise intermixed translucent color and opaque white inks, portions of light 1040 may thus penetrate through all four printed layers, or may penetrate only through one or more printed layers, regardless of the presence of crack 905. Thus, observer 805 may view a combination of light rays 1040 reflected from more than one of layers 305 as well as from the region exposed by crack 905. Thus, when viewing printed layers 305 comprising crack 905, observer 805 may observe crack 905, but crack 905 may only appear with a slightly lighter color or slightly darker color than the overall color-accurate color printed by layers 305. As also shown in FIG. 16, however, this contrasts with what observer 805 sees when viewing light 950 reflected from white layer 220 and crack 910.

For example, in FIG. 16, an observer 805 may also observe light reflected from printed color layer 222 of layer 205 described with reference to known technique 200 of FIG. 3. As shown in FIG. 16, portions of incoming visible spectrum light 950 may pass through color layer 222 of layers 205, and reflect off of the uppermost surface of white layer 220 back to observer 805. This is because color layer 222 comprises translucent cyan and yellow inks while white layer 220 (and white layers 210 through 218) comprises opaque ink. That is, as described earlier with reference to FIG. 3, observer 805 will be effectively viewing printed color present only in layer 222, because printing of underlying white layers is required by known techniques to create an underlying white substrate for color-accurate printing. Light 950, however, may also pass through and be reflected from one or more portions of crack 910.

Still referring to FIG. 16, light 950 may pass through uppermost printed color layer 222 in the region of crack 910, and reflect back from one or more of the underlying white layers 220, 218, etc. back to observer 805. In this case, light 950 may not pass back through color layer 222 in the region of crack 910. Thus, when viewing printed layers 205 comprising crack 910, observer 805 may readily observe crack 910, as crack 910 may appear white due to the reflection from one or more underlying white layers 220, 218, etc., without having passed back through color layer 222 in the region of crack 910. Thus, crack 910 may appear in high contrast against color layer 222 upon viewing by observer 805.

Figure 17:
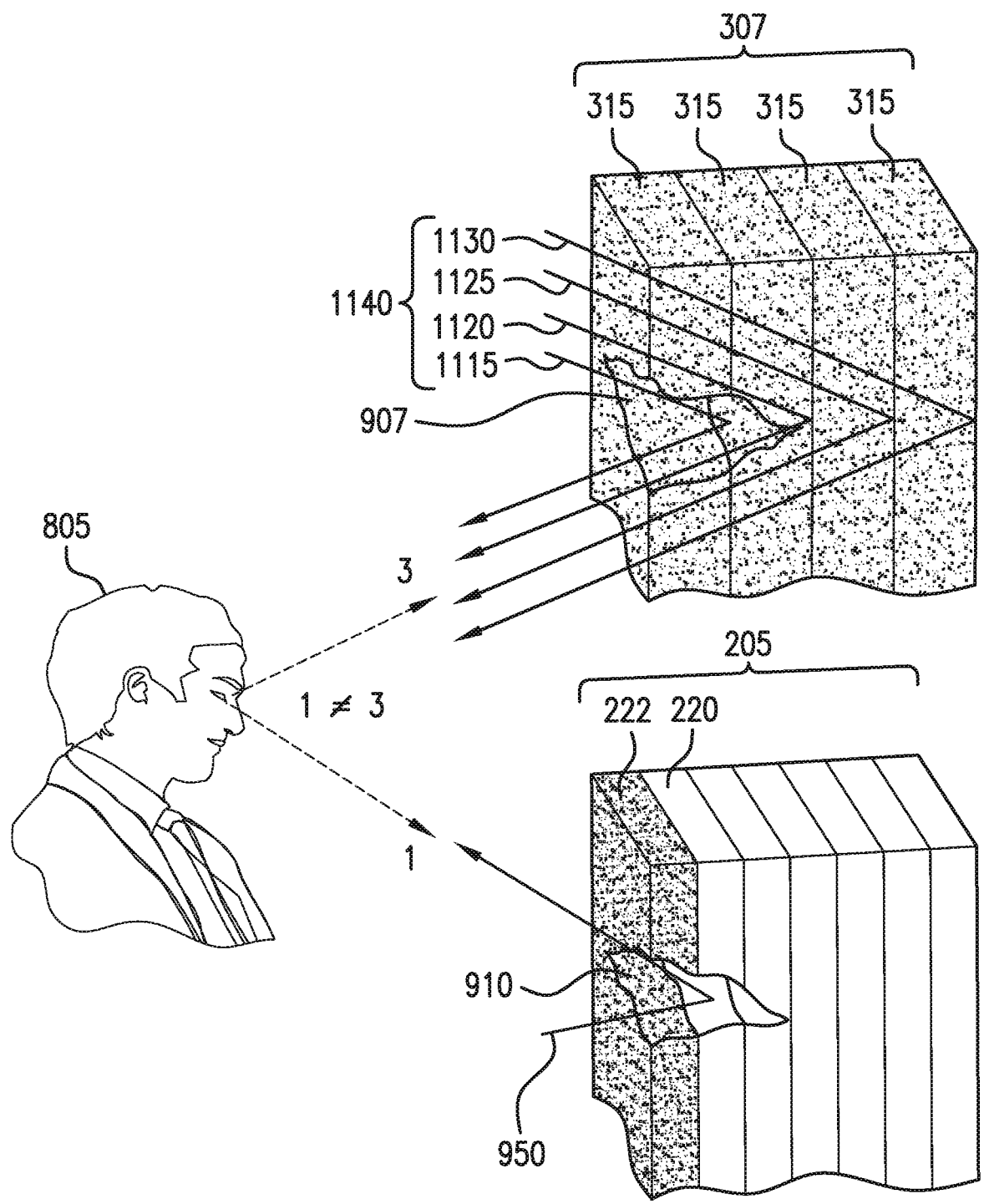
FIG. 17 shows a schematic view of an observer viewing an exemplary color-accurate color printed on a nonwhite substrate and having a scratch or crack embedded therein, consistent with an embodiment of the disclosure, the scratched color-accurate color appearing less visually noticeable to the observer as that of the scratched color comparatively printed using a conventional printing technique.

Referring to FIG. 17, and consistent with an embodiment, further benefits of the disclosed printing techniques will be discussed in the situation where the printed color surface may be scratched, abraded, or otherwise damaged or marred. As shown in FIG. 17, a printed surface printed according to one more techniques disclosed herein may be visually inspected or instrument tested and compared against a printed surface printed according to a known technique, when both surfaces are printed onto nonwhite substrates and when both surfaces contain as least one scratch, abrasion, or mar. For example, printed layers 307, printed as described above with reference to technique 302 shown in FIG. 5, may contain a scratch, abrasion, or mar 907, and printed layers 205 (as similarly shown in FIG. 16) may likewise contain a substantially identical scratch, abrasion, or mar 910.

Still referring to FIG. 17, and consistent with an embodiment, observer 805 may observe light reflected from multiple printed layers 307 printed using printer 100 shown and described with reference to FIG. 5. As shown in FIG. 17, portions of incoming visible spectrum light 1140 may pass through each of the four layers 315 of printed material 307, and reflect back from one or more of these layers back to observer 805. This is because each of layers 315 comprise a substantially identical predetermined intermixture of translucent cyan ink, translucent yellow ink, and opaque white ink. Light 1140 may also pass through and be reflected from one or more portions of crack 907.

Consistent with an embodiment, light 1140 is shown in FIG. 17 divided into light rays 1115, 1120, 1125, and 1130. Light ray 1115 may pass through uppermost printed layer 315 and portion of crack 907 therein, and reflect back through uppermost printed layer 315 to observer 805. Light ray 1120 may pass through the first and second printed layers 315 and a portion of crack 907 therein, and reflect back through these layers to observer 805. Light ray 1125 may pass through the first, second, and third printed layers, and crack 907, and reflect back through these layers to observer 805. Finally, light ray 1130 may pass through the first, second, third, and fourth printed layers, and crack 907, and reflect back through these layers to observer 805.

Because each layer of printed material 307 may comprise a predetermined and substantially identical ratio of intermixed translucent color and opaque white inks, portions of light 1140 may thus penetrate through all four printed layers, or may penetrate only through one or more printed layers, regardless of the presence of crack 907. Thus, observer 805 may view a combination of light rays 1140 reflected from more than one of the layers as well as from the region exposed by crack 907. Thus, when viewing the printed layers 307 comprising crack 907, observer 805 may observe crack 907, but crack 907 may only appear with a slightly lighter color or slightly darker color than the overall color-accurate color printed by the combination of layers 307. As also shown in FIG. 17, however, and similar to that shown in FIG. 16, this contrasts with what observer 805 sees when viewing light 950 reflected from white layer 220 and crack 910, where crack 910 may appear in high contrast against color layer 222 upon viewing by observer 805.

Figure 18:
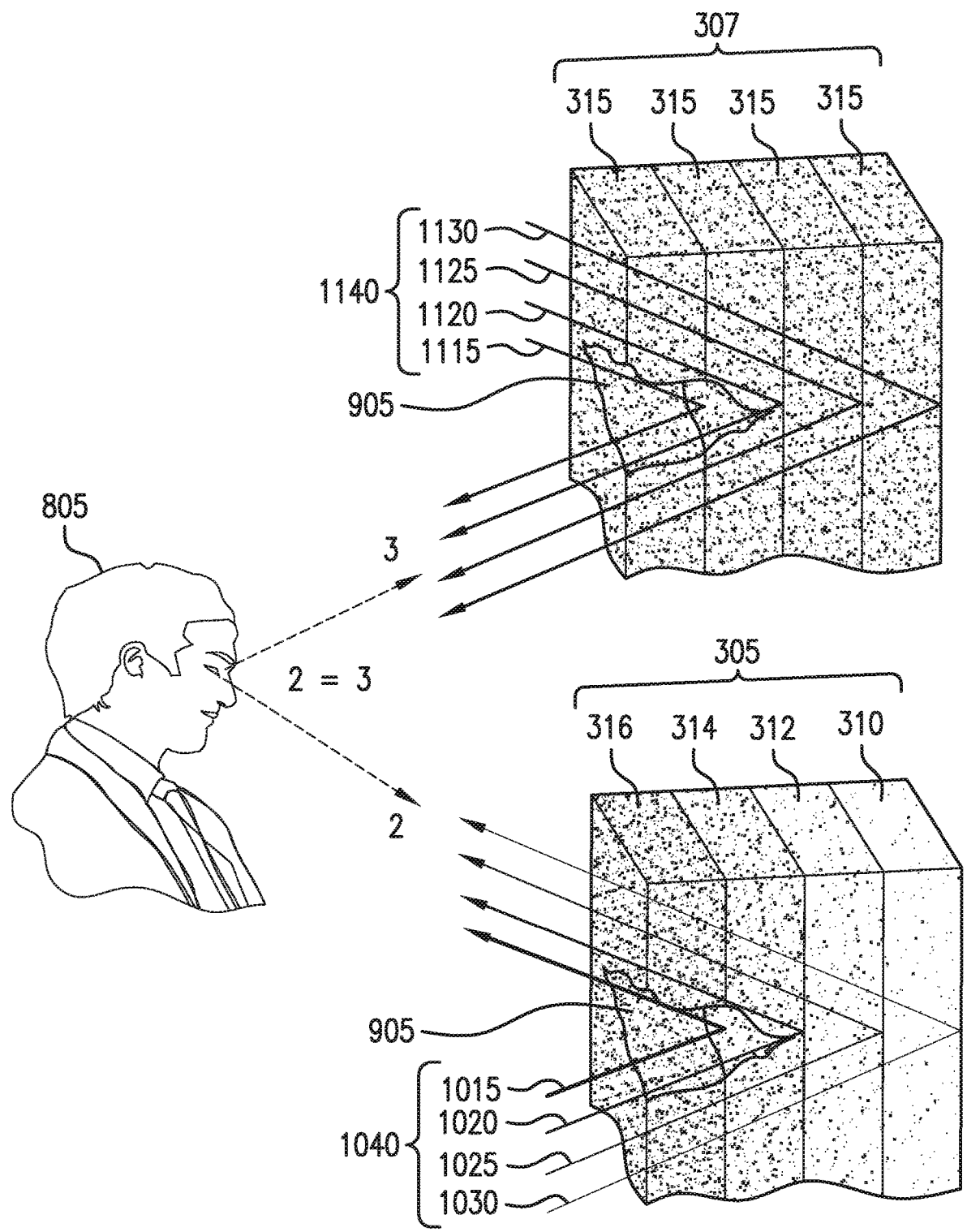
FIG. 18 shows a schematic view of an observer viewing an exemplary color-accurate color printed on a nonwhite substrate and having a scratch or crack embedded therein, consistent with an embodiment of the disclosure as shown in FIGS. 16 and 17, the scratched color-accurate color of FIGS. 16 and 17 appearing equally less visually noticeable to the observer as that of the scratched color comparatively printed using a conventional printing technique.

Referring to FIG. 18, and consistent with an embodiment, observer 805 may thus view each of reflected light 1040 and 1140, and see the same color. In FIG. 18, drawn from the exemplary color printing techniques described with reference to FIGS. 16 and 17 (and in contrast with the known technique of FIG. 3) observer 805 may see color-accurate green color when viewing each of reflected light 1040 and reflected light 1140. That is, the printing techniques 300 and 302 described with reference to FIGS. 4 and 5 will produce color-accurate green color in a manner that is visually and instrument-testing indistinguishable from each other, even when one or more of the printed layers may be scratched or otherwise marred by crack 905 or crack 907.

Figure 19:
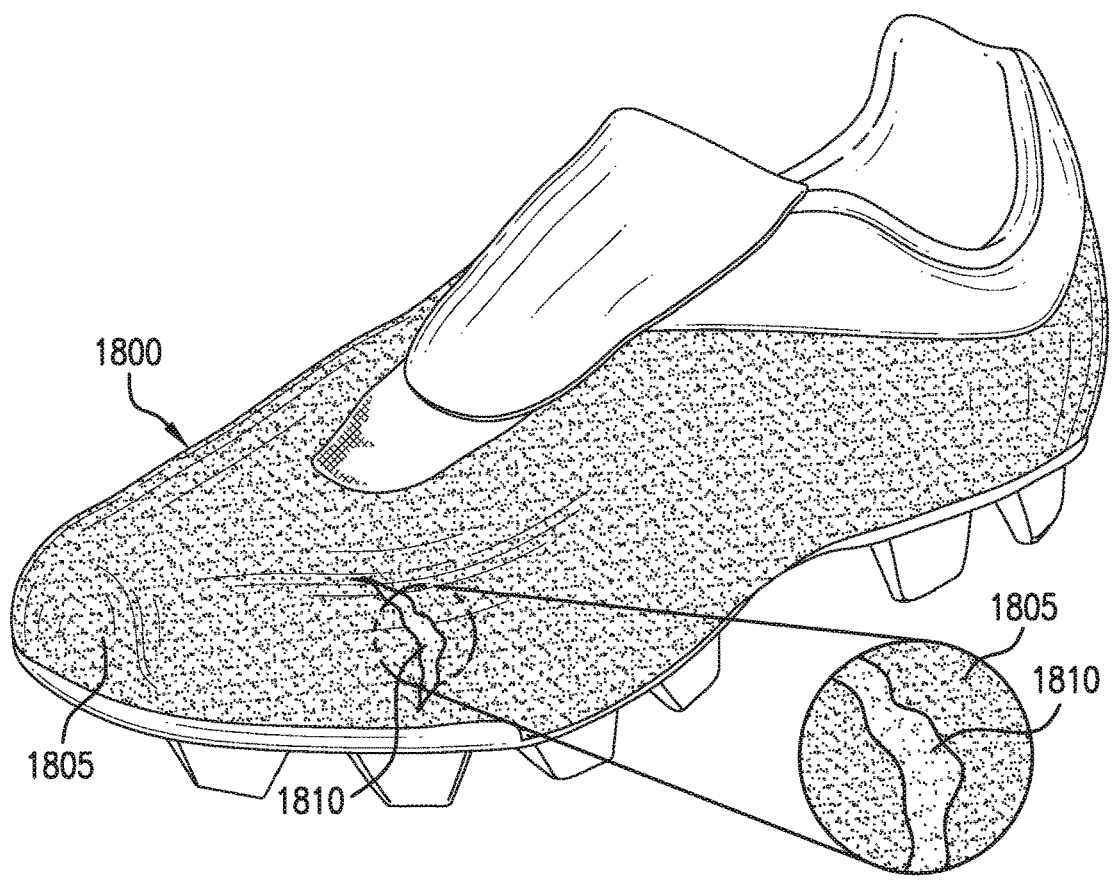
FIG. 19 shows a perspective view of an athletic shoe having an upper comprising a printed color-accurate color and a scratch or crack embedded therein along with a magnified view of the scratch region showing a low contrast region of slightly lighter color in the scratch when the shoe is printed consistent with an embodiment of the disclosure, compared against a perspective view of an athletic shoe having an upper comprising a printed color-accurate color and a scratch or crack embedded therein along with a magnified view of the scratch region showing a high contrast region of white in the scratch when the shoe is printed using a conventional printing technique.
Figure 19:
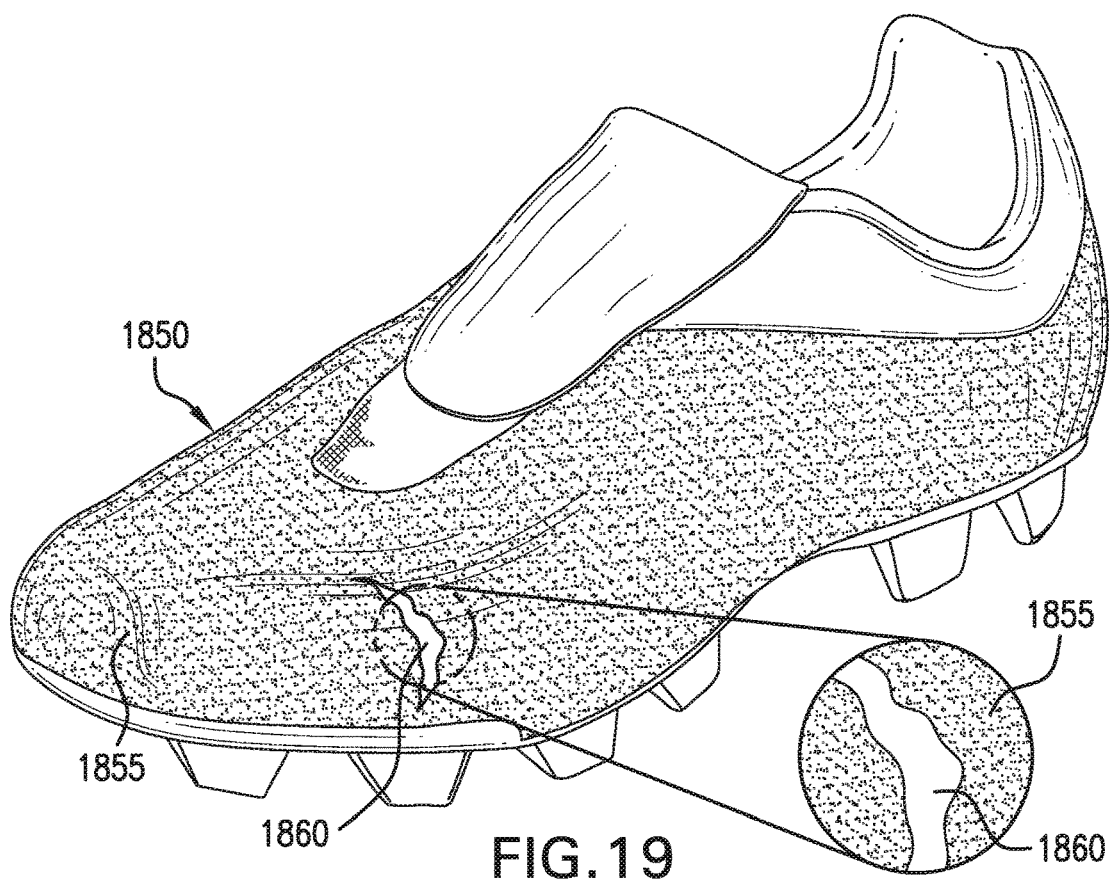

This difference may be exemplified as shown in FIG. 19. Referring to FIG. 19, and consistent with an embodiment, an athletic shoe, such as soccer shoe 1800, may comprise one or more printed regions 1805. Printed regions 1805 may be printed, for example, according to printing techniques discussed herein with reference to any of FIGS. 4-12. In the case of soccer shoe 1800, athletic use may impart significant wear-and-tear on the surface finish of the shoe. Such wear-and-tear may take the form of any number of scratches, abrasions, or mars in the finish of printed regions 1805. While such damage to the finish of printed regions 1805 may be undesirable, it may also be unavoidable during the rigors of use demanded of shoe 1800. Therefore, it is desirable to minimize the visibility of any such damage during the usable lifetime of shoe 1800. Such minimization may be achieved by implementing the printing techniques disclosed herein.

Consistent with an embodiment, and still referring to FIG. 19, exemplary wear-and-tear is shown by scratch 1810 in shoe 1000. As shown and described earlier with reference to FIGS. 16 and 17, light rays passing through printed regions 1805 will not result in a high contrast difference between the printed regions 1805 and that of scratch 1810. As discussed earlier, an observer may view a combination of light rays reflected from more than one of layers of printed regions 1805, as well as from the region exposed by crack 1810. That is, because the underlying printed layers comprise a mixture of translucent color ink and opaque white ink, color from one or more exposed underlying layers will be visible to an observer when those one or more underlying layers are exposed by crack 1810. Thus, when viewing printed region 1805 and crack 1810, crack 1810 may only appear with a slightly lighter color or slightly darker color than the overall color of printed regions 1805. As also shown in FIG. 19, however, this contrasts with what may be observed when viewing light reflected similarly from a shoe comprising regions printed according to existing techniques.

Still referring to FIG. 19, another exemplary wear-and-tear is also shown by scratch 1860 in soccer shoe 1850. Soccer shoe 1850 may comprise one or more printed regions 1855. Printed regions 1855 may be printed, for example, according to existing printing techniques discussed earlier with reference to FIG. 3. As shown and described earlier with reference to FIG. 16, light rays passing through printed regions 1855 will result in a high contrast difference between the printed regions 1855 and that of crack 1860. As discussed earlier, an observer may view light that has passed through the opening exposed by crack 1860 and reflected off of one or more of the underlying printed white layers back to the observer. The light, however, may also pass through and be reflected from one or more portions of crack 1860. Thus, when viewing printed regions 1855 and crack 1860, crack 1860 may appear with a high contrast difference against printed regions 1855 due to the exposure of one or more underlying opaque white layers. As also shown in FIG. 19, crack 1860 may appear as a white mark relative to the balance of printed regions 1855.

Consistent with an embodiment, therefore color durability may be achieved with printed colors according to the disclosed techniques. That is, damage due to scratching, abrasion, or otherwise marring a surface printed using disclosed techniques will be less visible upon observation that similar damage inflicted on a surface printing using existing techniques. Color printing according to the disclosed techniques will be more durable and damage less visible.

For example, applying the Stoll abrasion method, the color durability of printed layers printed according to known printing techniques may only achieve approximately 100 to approximately 120 revolutions of a Stoll abrasion disc before the printed color becomes significantly damaged. This is because the existing printing techniques essentially have only one uppermost layer of printed color, layered over several layers of printed white. Any damage to the uppermost color layer will be more readily apparent because underlying white layers may be exposed. Thus, color durability will be low.

In contrast, applying the Stoll abrasion method to printed layers printed according to disclosed embodiments, may achieve approximately 400 to approximately 450 revolutions of a Stoll abrasion disc before the printed color becomes significantly damaged. This is because the disclosed techniques have multiple layers of translucent color printed in combination with opaque white, such that color is printed throughout all of the printed layers. Any damage to the uppermost color layer will be less apparent because underlying printed layers also contain color intermixed with white. Despite the possible exposure of one or more of these underlying layers, less noticeable variations in color may be observed. Thus, color durability will be high.

Also consistent with an embodiment, the disclosed printing techniques are also applicable to hot-melt printing, whereby solids are melted into a viscous fluid and printed, e.g., an opaque polyurethane and at least one translucent pigmented material. For example, abrasion resistance may also be achieved using the disclosed printing techniques in a hot-melt printer, because printing of opaque polyurethane may be combined with translucent pigmented material that would mix together upon printing onto a substrate.

While various embodiments have been described, the description is intended to be exemplary, rather than limiting, and it will be apparent to those of ordinary skill in the art that many more embodiments and implementations are possible that are within the scope of the disclosure. It is intended that all such additional systems, methods, features and advantages be included within this description and this summary, be within the scope of the disclosure, and be protected by the following claims.

I claim:

1. An article of apparel comprising:
a substrate; and
a plurality of sequential layers of a white ink and at least one color ink,
the plurality of sequential layers comprising:
a first layer of ink having a first mixture of the white ink and the at least one color ink, the first layer of ink having a first ratio of the white ink to the at least one color ink;
a second layer of ink having a second mixture of the white ink and the at least one color ink, the second layer of ink being on at least a portion of the first layer of ink and having a second ratio of the white ink to the at least one color ink different from the first ratio,
a third layer of ink having a third mixture of the white ink and the at least one color ink, the third layer of ink being on at least a portion of the second layer of ink and having a third ratio of the white ink to the at least one color ink different from the second ratio and the first ratio, and
wherein the first ratio is greater than the second ratio, and the second ratio is greater than the third ratio.

2. The article of apparel of claim 1,
wherein an amount of the white ink in the second layer of ink is less than an amount of the white ink in the first layer, and an amount of the white ink in the third layer of ink is less than the amount of the white ink in the second layer of ink, and
wherein an amount of the at least one color ink in the third layer of ink is greater than the amount of the at least one color ink in the second layer of ink.

3. The article of apparel of claim 1,
wherein the plurality of sequential layers comprises:
a fourth layer of ink having a fourth mixture of the white ink and the at least one color ink, the fourth layer of ink being on at least a portion of the third layer of ink and having a fourth ratio of the white ink to the at least one color ink different from the third ratio, the second ratio, and the first ratio, and
wherein the third ratio is greater than the fourth ratio.

4. The article of apparel of claim 3,
wherein an amount of the white ink in the fourth layer of ink is less than the amount of the white ink in the third layer of ink, and
wherein an amount of the at least one color ink in the fourth layer of ink is greater than the amount of the at least one color ink in the third layer of ink.

5. The article of apparel of claim 1, wherein the white ink is substantially opaque and the at least one color ink is substantially translucent.

6. The article of apparel of claim 1, wherein the plurality of sequential layers are abrasion resistant.

7. The article of apparel of claim 1, wherein the substrate comprises a fabric material.

8. The article of apparel of claim 7, wherein the fabric material comprises a textile material, a woven material, a nonwoven material, and/or a leather material.

9. The article of apparel of claim 1, wherein the article of apparel is an article of footwear.

10. The article of apparel of claim 1, wherein infliction of scratching or abrasion to the plurality of sequential layers exposes a lighter shade of the at least one color ink.

11. The article of apparel of claim 3, wherein the plurality of sequential layers comprise more than four layers of ink.

12. The article of apparel of claim 1, wherein the substrate is a nonwhite substrate.

13. An article of apparel comprising:
a substrate; and
a plurality of hot-melt layers of a mixture of an opaque material and at least one substantially translucent pigmented material,
the plurality of hot-melt layers comprising:
a first layer in contact with the substrate comprising the opaque material and at least one translucent pigmented material, the first layer having a first ratio of opaque material to translucent pigmented material;
a second layer on at least a portion of the first layer, the second layer comprising the opaque material and the at least one translucent pigmented material, the second layer having a second ratio of opaque material to translucent pigmented material; and
a third layer on at least a portion of the second layer, the third layer comprising the opaque material and the at least one translucent pigmented material, the third layer having a third ratio of opaque material to translucent pigmented material,
wherein the first ratio is greater than the second ratio, and the second ratio is greater than the third ratio.

14. The article of apparel of claim 13,
wherein the substrate is a nonwhite substrate, and
wherein at least a portion of the first layer, second, layer, and third layers overlap and a sum of the plurality of layers of opaque material and translucent pigmented material on the nonwhite substrate at the overlapping portion produces a desired color that is optically indistinguishable in the visible spectrum from the same color printed onto a white substrate using opaque color inks.

15. The article of apparel of claim 13, wherein the plurality of hot-melt layers further comprise a fourth layer on at least a portion of the third layer, the fourth layer comprising the opaque material and the at least one translucent pigmented material, the fourth layer having a fourth ratio of opaque material to translucent pigmented material different from the third ratio, the second ratio, and the first ratio, and
wherein the third ratio is greater than the fourth ratio.

16. The article of apparel of claim 15,
wherein an amount of the opaque material in the second layer is less than an amount of the opaque material in the first layer, wherein an amount of the opaque material in the third layer is less than the amount of the opaque material in the second layer, wherein an amount of the opaque material in the fourth layer is less than the amount of the opaque material in the third layer, and
wherein an amount of the at least one translucent pigmented material in the second layer is greater than an amount of the at least one translucent pigmented material in the first layer, wherein an amount of the at least one translucent pigmented material in the third layer is greater than the amount of the at least one translucent pigmented material in the second layer, and wherein an amount of the at least one translucent pigmented material in the fourth layer is greater than the amount of the at least one translucent pigmented material in the third layer.

17. The article of apparel of claim 13, wherein the plurality of hot-melt layers are abrasion resistant.

18. The article of apparel of claim 13, wherein the substrate comprises a fabric material.

19. The article of apparel of claim 13, wherein the article of apparel is an article of footwear.

20. The article of apparel of claim 13, wherein the opaque materials and the at least one substantially translucent pigmented materials are chosen from an ink, a dye, a resin, an acrylic, a polymer, a thermoplastic material, a thermosetting material, and a light-curable material.

\* \* \* \* \*